(12) United States Patent
Ono

(10) Patent No.: US 11,226,470 B2
(45) Date of Patent: Jan. 18, 2022

(54) IMAGING APPARATUS AND MOBILE IMAGING APPARATUS

(71) Applicant: FUJIFILM Corporation, Tokyo (JP)

(72) Inventor: Shuji Ono, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 268 days.

(21) Appl. No.: 16/716,498

(22) Filed: Dec. 17, 2019

(65) Prior Publication Data

US 2020/0124824 A1   Apr. 23, 2020

Related U.S. Application Data

(63) Continuation of application No. PCT/JP2018/021186, filed on Jun. 1, 2018.

(30) Foreign Application Priority Data

Jun. 21, 2017   (JP) .............................. JP2017-121362

(51) Int. Cl.
| | |
|---|---|
| *H04N 5/225* | (2006.01) |
| *G02B 7/36* | (2021.01) |
| *G03B 13/36* | (2021.01) |
| *G03B 37/00* | (2021.01) |
| *H04N 5/232* | (2006.01) |

(52) U.S. Cl.
CPC .............. *G02B 7/36* (2013.01); *G03B 13/36* (2013.01); *G03B 37/00* (2013.01); *H04N 5/2258* (2013.01); *H04N 5/23212* (2013.01)

(58) Field of Classification Search
CPC ................................... H04N 5/2258
USPC ........................................................ 348/345
See application file for complete search history.

(56) References Cited

U.S. PATENT DOCUMENTS

| | | | |
|---|---|---|---|
| 7,764,440 B2 | 7/2010 | Border et al. | |
| 10,244,165 B2 * | 3/2019 | Ono ...................... | G02B 13/00 |

(Continued)

FOREIGN PATENT DOCUMENTS

| | | |
|---|---|---|
| JP | 2009128527 | 6/2009 |
| JP | 2011505022 | 2/2011 |

(Continued)

OTHER PUBLICATIONS

"International Search Report (Form PCT/ISA/210) of PCT/JP2018/021186," dated Aug. 28, 2018, with English translation thereof, pp. 1-3.

(Continued)

*Primary Examiner* — Joel W Fosselman
(74) *Attorney, Agent, or Firm* — JCIPRNET

(57) ABSTRACT

Provided are an imaging apparatus and a mobile imaging apparatus capable of reducing the size and weight of a structure relating to focus adjustment. The imaging apparatus 1 includes: a central optical system 12 that captures an image with pan focus; an annular optical system 14 that is disposed concentrically with the central optical system 12; and an image sensor 20 that simultaneously captures an image to be formed through the central optical system and an image to be formed through the annular optical system 14. In the imaging apparatus 1, the central optical system 12 and the image sensor 20 are moved integrally along the optical axis L so as to adjust a focal point of the annular optical system 14.

20 Claims, 29 Drawing Sheets

(56) References Cited

U.S. PATENT DOCUMENTS

2006/0245046 A1 11/2006 Bergeron et al.
2017/0155821 A1 6/2017 Ono

FOREIGN PATENT DOCUMENTS

| JP | 2016012786 | 1/2016 |
| JP | 2016051011 | 4/2016 |

OTHER PUBLICATIONS

"Written Opinion of the International Searching Authority (Form PCT/ISA/237) of PCT/JP2018/021186," dated Aug. 28, 2018, with English translation thereof, pp. 1-7.

\* cited by examiner

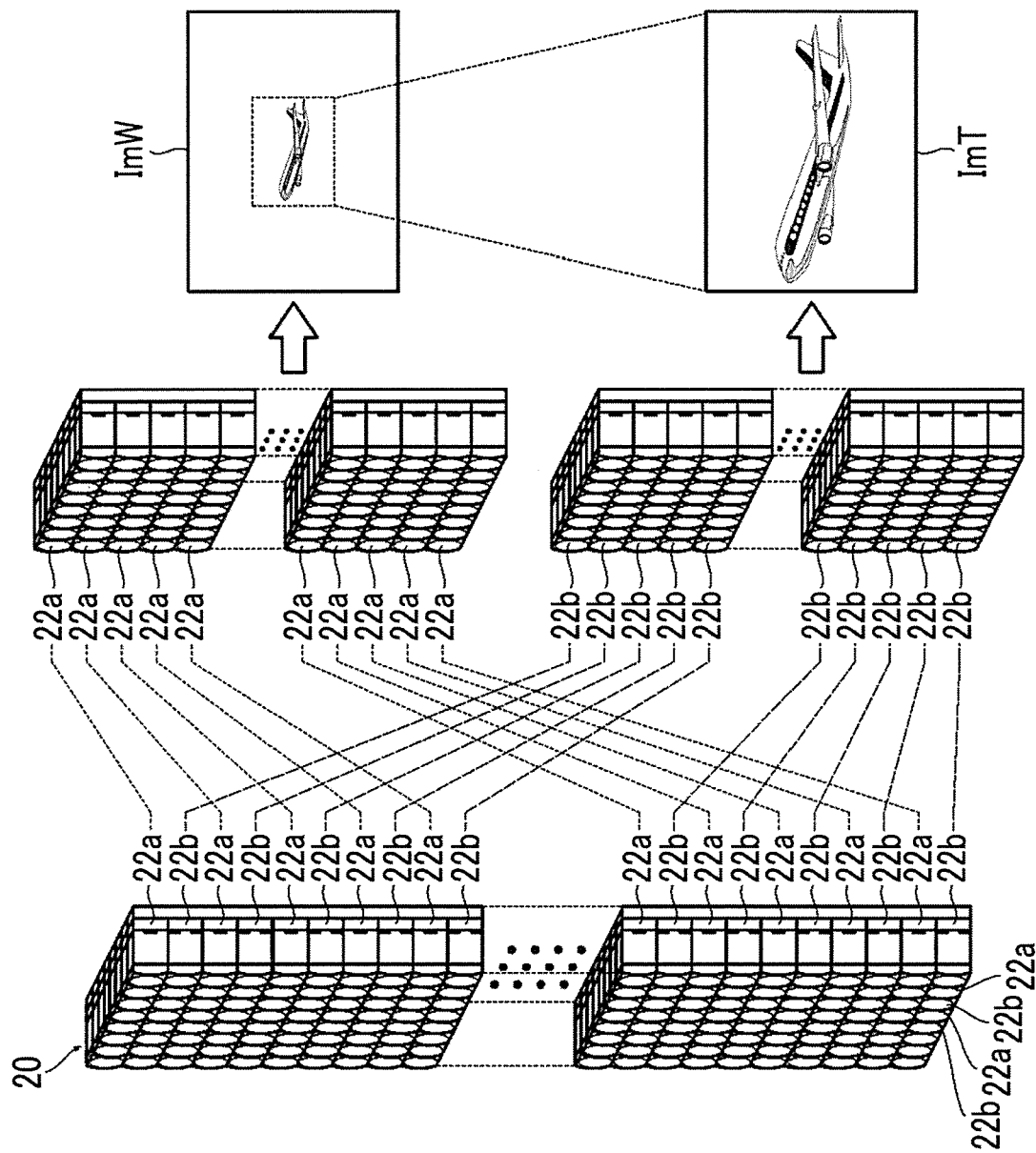

FIG. 17

|  | POSITION OF IMAGE SENSOR [mm] | IN-FOCUS SUBJECT DISTANCE [mm] | F-NUMBER | LEAST CIRCLE OF CONFUSION [mm] | FORWARD DEPTH OF FIELD [mm] | BACKWARD DEPTH OF FIELD [mm] |
|---|---|---|---|---|---|---|
| SCAN FORWARD | 46.12320 | 955.832 | 1.4 | 0.00710 | 4.66787 | |
| | 46.11228 | 960.546 | 1.4 | 0.00710 | 4.71391 | |
| | 46.10136 | 965.307 | 1.4 | 0.00710 | 4.76063 | |
| | 46.09045 | 970.115 | 1.4 | 0.00710 | 4.80806 | |
| | 46.07955 | 974.971 | 1.4 | 0.00710 | 4.85619 | |
| | 46.06865 | 979.876 | 1.4 | 0.00710 | 4.90506 | |
| | 46.05776 | 984.831 | 1.4 | 0.00710 | 4.95466 | |
| | 46.04687 | 989.836 | 1.4 | 0.00710 | 5.00502 | |
| | 46.03598 | 994.892 | 1.4 | 0.00710 | 5.05615 | |
| | 46.02510 | 1000.000 | 1.4 | 0.00710 | 5.10807 | |
| | 46.01423 | 1005.161 | 1.4 | 0.00710 | | 5.16079 |
| | 46.00336 | 1010.375 | 1.4 | 0.00710 | | 5.21434 |
| | 45.99250 | 1015.644 | 1.4 | 0.00710 | | 5.26872 |
| | 45.98164 | 1020.968 | 1.4 | 0.00710 | | 5.32396 |
| SCAN BACKWARD | 45.97079 | 1026.348 | 1.4 | 0.00710 | | 5.38007 |
| | 45.95994 | 1031.785 | 1.4 | 0.00710 | | 5.43707 |
| | 45.94910 | 1037.280 | 1.4 | 0.00710 | | 5.49498 |
| | 45.93826 | 1042.834 | 1.4 | 0.00710 | | 5.55382 |
| | 45.92743 | 1048.447 | 1.4 | 0.00710 | | 5.61362 |
| | | | | | | 5.67438 |

FIG. 19A

| No. | SAWTOOTH WAVE DRIVING | POSITION OF IMAGE SENSOR [mm] | IN-FOCUS SUBJECT DISTANCE [mm] | IN-FOCUS POSITION CHANGE AMOUNT [mm] |
|---|---|---|---|---|
| 0 | 0 | 45.92743 | 1048.44737 | |
| 1 | 1 | 45.93830 | 1042.81128 | 5.6 |
| 2 | 2 | 45.94918 | 1037.23809 | 5.6 |
| 3 | 3 | 45.96006 | 1031.72674 | 5.5 |
| 4 | 4 | 45.97093 | 1026.27623 | 5.5 |
| 5 | 5 | 45.98181 | 1020.88553 | 5.4 |
| 6 | 6 | 45.99268 | 1015.55369 | 5.3 |
| 7 | 7 | 46.00356 | 1010.27973 | 5.3 |
| 8 | 8 | 46.01444 | 1005.06272 | 5.2 |
| 9 | 9 | 46.02531 | 999.90173 | 5.2 |
| 10 | 10 | 46.03619 | 994.79589 | 5.1 |
| 11 | 11 | 46.04706 | 989.74430 | 5.1 |
| 12 | 12 | 46.05794 | 984.74610 | 5.0 |
| 13 | 13 | 46.06882 | 979.80046 | 4.9 |
| 14 | 14 | 46.07969 | 974.90654 | 4.9 |
| 15 | 15 | 46.09057 | 970.06354 | 4.8 |
| 16 | 16 | 46.10145 | 965.27068 | 4.8 |
| 17 | 17 | 46.11232 | 960.52717 | 4.7 |
| 18 | 18 | 46.12320 | 955.83226 | 4.7 |
| 19 | 0 | 45.92743 | 1048.44737 | 92.6 |
| 20 | 1 | 45.93830 | 1042.81128 | 5.6 |
| 21 | 2 | 45.94918 | 1037.23809 | 5.6 |
| 22 | 3 | 45.96006 | 1031.72674 | 5.5 |
| 23 | 4 | 45.97093 | 1026.27623 | 5.5 |
| 24 | 5 | 45.98181 | 1020.88553 | 5.4 |
| 25 | 6 | 45.99268 | 1015.55369 | 5.3 |
| 26 | 7 | 46.00356 | 1010.27973 | 5.3 |
| 27 | 8 | 46.01444 | 1005.06272 | 5.2 |
| 28 | 9 | 46.02531 | 999.90173 | 5.2 |
| 29 | 10 | 46.03619 | 994.79589 | 5.1 |
| 30 | 11 | 46.04706 | 989.74430 | 5.1 |
| 31 | 12 | 46.05794 | 984.74610 | 5.0 |
| 32 | 13 | 46.06882 | 979.80046 | 4.9 |
| 33 | 14 | 46.07969 | 974.90654 | 4.9 |
| 34 | 15 | 46.09057 | 970.06354 | 4.8 |
| 35 | 16 | 46.10145 | 965.27068 | 4.8 |
| 36 | 17 | 46.11232 | 960.52717 | 4.7 |
| 37 | 18 | 46.12320 | 955.83226 | 4.7 |

FIG. 19B

| No. | SAWTOOTH WAVE DRIVING | POSITION OF IMAGE SENSOR [mm] | IN-FOCUS SUBJECT DISTANCE [mm] | IN-FOCUS POSITION CHANGE AMOUNT [mm] |
|---|---|---|---|---|
| 38 | 0 | 45.92743 | 1048.44737 | 92.6 |
| 39 | 1 | 45.93830 | 1042.81128 | 5.6 |
| 40 | 2 | 45.94918 | 1037.23809 | 5.6 |
| 41 | 3 | 45.96006 | 1031.72674 | 5.5 |
| 42 | 4 | 45.97093 | 1026.27623 | 5.5 |
| 43 | 5 | 45.98181 | 1020.88553 | 5.4 |
| 44 | 6 | 45.99268 | 1015.55369 | 5.3 |
| 45 | 7 | 46.00356 | 1010.27973 | 5.3 |
| 46 | 8 | 46.01444 | 1005.06272 | 5.2 |
| 47 | 9 | 46.02531 | 999.90173 | 5.2 |
| 48 | 10 | 46.03619 | 994.79589 | 5.1 |
| 49 | 11 | 46.04706 | 989.74430 | 5.1 |
| 50 | 12 | 46.05794 | 984.74610 | 5.0 |
| 51 | 13 | 46.06882 | 979.80046 | 4.9 |
| 52 | 14 | 46.07969 | 974.90654 | 4.9 |
| 53 | 15 | 46.09057 | 970.06354 | 4.8 |
| 54 | 16 | 46.10145 | 965.27068 | 4.8 |
| 55 | 17 | 46.11232 | 960.52717 | 4.7 |
| 56 | 18 | 46.12320 | 955.83226 | 4.7 |
| 57 | 0 | 45.92743 | 1048.44737 | 92.6 |
| 58 | 1 | 45.93830 | 1042.81128 | 5.6 |
| 59 | 2 | 45.94918 | 1037.23809 | 5.6 |
| 60 | 3 | 45.96006 | 1031.72674 | 5.5 |
| 61 | 4 | 45.97093 | 1026.27623 | 5.5 |
| 62 | 5 | 45.98181 | 1020.88553 | 5.4 |
| 63 | 6 | 45.99268 | 1015.55369 | 5.3 |
| 64 | 7 | 46.00356 | 1010.27973 | 5.3 |
| 65 | 8 | 46.01444 | 1005.06272 | 5.2 |
| 66 | 9 | 46.02531 | 999.90173 | 5.2 |
| 67 | 10 | 46.03619 | 994.79589 | 5.1 |
| 68 | 11 | 46.04706 | 989.74430 | 5.1 |
| 69 | 12 | 46.05794 | 984.74610 | 5.0 |
| 70 | 13 | 46.06882 | 979.80046 | 4.9 |
| 71 | 14 | 46.07969 | 974.90654 | 4.9 |
| 72 | 15 | 46.09057 | 970.06354 | 4.8 |
| 73 | 16 | 46.10145 | 965.27068 | 4.8 |
| 74 | 17 | 46.11232 | 960.52717 | 4.7 |
| 75 | 18 | 46.12320 | 955.83226 | 4.7 |
| 76 | 0 | 45.92743 | 1048.44737 | 92.6 |

FIG. 21A

| No. | SINUSOIDAL WAVE DRIVING | POSITION OF IMAGE SENSOR [mm] | IN-FOCUS SUBJECT DISTANCE [mm] | IN-FOCUS POSITION CHANGE AMOUNT [mm] |
|---|---|---|---|---|
| 0 | 0.00 | 46.02510 | 1000.00000 | |
| 1 | 0.12 | 46.03690 | 994.46240 | 5.5 |
| 2 | 0.24 | 46.04853 | 989.06795 | 5.4 |
| 3 | 0.35 | 46.05982 | 983.89023 | 5.2 |
| 4 | 0.46 | 46.07059 | 978.99743 | 4.9 |
| 5 | 0.57 | 46.08071 | 974.45186 | 4.5 |
| 6 | 0.66 | 46.09001 | 970.30949 | 4.1 |
| 7 | 0.75 | 46.09837 | 966.61984 | 3.7 |
| 8 | 0.82 | 46.10566 | 963.42574 | 3.2 |
| 9 | 0.89 | 46.11178 | 960.76336 | 2.7 |
| 10 | 0.94 | 46.11663 | 958.66219 | 2.1 |
| 11 | 0.97 | 46.12015 | 957.14509 | 1.5 |
| 12 | 0.99 | 46.12228 | 956.22833 | 0.9 |
| 13 | 1.00 | 46.12299 | 955.92167 | 0.3 |
| 14 | 0.99 | 46.12228 | 956.22833 | 0.3 |
| 15 | 0.97 | 46.12015 | 957.14509 | 0.9 |
| 16 | 0.94 | 46.11663 | 958.66219 | 1.5 |
| 17 | 0.89 | 46.11178 | 960.76336 | 2.1 |
| 18 | 0.82 | 46.10566 | 963.42574 | 2.7 |
| 19 | 0.75 | 46.09837 | 966.61984 | 3.2 |
| 20 | 0.66 | 46.09001 | 970.30949 | 3.7 |
| 21 | 0.57 | 46.08071 | 974.45185 | 4.1 |
| 22 | 0.46 | 46.07059 | 978.99743 | 4.5 |
| 23 | 0.35 | 46.05982 | 983.89022 | 4.9 |
| 24 | 0.24 | 46.04853 | 989.06794 | 5.2 |
| 25 | 0.12 | 46.03690 | 994.46240 | 5.4 |
| 26 | 0.00 | 46.02510 | 1000.00000 | 5.5 |
| 27 | -0.12 | 46.01331 | 1005.60250 | 5.6 |
| 28 | -0.24 | 46.00168 | 1011.18792 | 5.6 |
| 29 | -0.35 | 45.99039 | 1016.67165 | 5.5 |
| 30 | -0.46 | 45.97962 | 1021.96779 | 5.3 |
| 31 | -0.57 | 45.96950 | 1026.99074 | 5.0 |
| 32 | -0.66 | 45.96020 | 1031.65684 | 4.7 |
| 33 | -0.75 | 45.95184 | 1035.88620 | 4.2 |
| 34 | -0.82 | 45.94455 | 1039.60462 | 3.7 |
| 35 | -0.89 | 45.93843 | 1042.74540 | 3.1 |
| 36 | -0.94 | 45.93358 | 1045.25117 | 2.5 |
| 37 | -0.97 | 45.93006 | 1047.07544 | 1.8 |
| 38 | -0.99 | 45.92793 | 1048.18400 | 1.1 |

FIG. 21B

| No. | SINUSOIDAL WAVE DRIVING | POSITION OF IMAGE SENSOR [mm] | IN-FOCUS SUBJECT DISTANCE [mm] | IN-FOCUS POSITION CHANGE AMOUNT [mm] |
|---|---|---|---|---|
| 39 | -1.00 | 45.92722 | 1048.55587 | 0.4 |
| 40 | -0.99 | 45.92793 | 1048.18400 | 0.4 |
| 41 | -0.97 | 45.93006 | 1047.07544 | 1.1 |
| 42 | -0.94 | 45.93358 | 1045.25117 | 1.8 |
| 43 | -0.89 | 45.93843 | 1042.74540 | 2.5 |
| 44 | -0.82 | 45.94455 | 1039.60462 | 3.1 |
| 45 | -0.75 | 45.95184 | 1035.88621 | 3.7 |
| 46 | -0.66 | 45.96019 | 1031.65684 | 4.2 |
| 47 | -0.57 | 45.96950 | 1026.99075 | 4.7 |
| 48 | -0.46 | 45.97962 | 1021.96780 | 5.0 |
| 49 | -0.35 | 45.99039 | 1016.67165 | 5.3 |
| 50 | -0.24 | 46.00168 | 1011.18793 | 5.5 |
| 51 | -0.12 | 46.01331 | 1005.60251 | 5.6 |
| 52 | 0.00 | 46.02510 | 1000.00000 | 5.6 |
| 53 | 0.12 | 46.03690 | 994.46240 | 5.5 |
| 54 | 0.24 | 46.04853 | 989.06795 | 5.4 |
| 55 | 0.35 | 46.05982 | 983.89023 | 5.2 |
| 56 | 0.46 | 46.07059 | 978.99744 | 4.9 |
| 57 | 0.57 | 46.08071 | 974.45186 | 4.5 |
| 58 | 0.66 | 46.09001 | 970.30950 | 4.1 |
| 59 | 0.75 | 46.09837 | 966.61984 | 3.7 |
| 60 | 0.82 | 46.10566 | 963.42574 | 3.2 |
| 61 | 0.89 | 46.11178 | 960.76336 | 2.7 |
| 62 | 0.94 | 46.11663 | 958.66219 | 2.1 |
| 63 | 0.97 | 46.12015 | 957.14509 | 1.5 |
| 64 | 0.99 | 46.12228 | 956.22833 | 0.9 |
| 65 | 1.00 | 46.12299 | 955.92167 | 0.3 |
| 66 | 0.99 | 46.12228 | 956.22833 | 0.3 |
| 67 | 0.97 | 46.12015 | 957.14509 | 0.9 |
| 68 | 0.94 | 46.11663 | 958.66219 | 1.5 |
| 69 | 0.89 | 46.11178 | 960.76335 | 2.1 |
| 70 | 0.82 | 46.10566 | 963.42573 | 2.7 |
| 71 | 0.75 | 46.09837 | 966.61983 | 3.2 |
| 72 | 0.66 | 46.09001 | 970.30949 | 3.7 |
| 73 | 0.57 | 46.08071 | 974.45185 | 4.1 |
| 74 | 0.46 | 46.07059 | 978.99743 | 4.5 |
| 75 | 0.35 | 46.05982 | 983.89022 | 4.9 |
| 76 | 0.24 | 46.04853 | 989.06794 | 5.2 |

FIG. 23

| | IN-FOCUS SUBJECT DISTANCE [mm] | POSITION OF IMAGE SENSOR [mm] | F-NUMBER | LEAST CIRCLE OF CONFUSION [mm] | FORWARD DEPTH OF FIELD [mm] | BACKWARD DEPTH OF FIELD [mm] |
|---|---|---|---|---|---|---|
| SCAN FORWARD | 4437.4 | 85.621 | 1.4 | 0.00710 | 27.6 | |
| | 4465.3 | 85.610 | 1.4 | 0.00710 | 27.9 | |
| | 4493.6 | 85.600 | 1.4 | 0.00710 | 28.3 | |
| | 4522.2 | 85.590 | 1.4 | 0.00710 | 28.6 | |
| | 4551.2 | 85.580 | 1.4 | 0.00710 | 29.0 | |
| | 4580.6 | 85.569 | 1.4 | 0.00710 | 29.4 | |
| | 4610.3 | 85.559 | 1.4 | 0.00710 | 29.7 | |
| | 4640.5 | 85.549 | 1.4 | 0.00710 | 30.1 | |
| | 4671.0 | 85.538 | 1.4 | 0.00710 | 30.5 | |
| | 4701.9 | 85.528 | 1.4 | 0.00710 | 30.9 | |
| | 4733.3 | 85.518 | 1.4 | 0.00710 | 31.4 | |
| | 4765.1 | 85.507 | 1.4 | 0.00710 | 31.8 | |
| | 4797.3 | 85.497 | 1.4 | 0.00710 | 32.2 | |
| | 4829.9 | 85.487 | 1.4 | 0.00710 | 32.6 | |
| | 4863.0 | 85.476 | 1.4 | 0.00710 | 33.1 | |
| | 4896.5 | 85.466 | 1.4 | 0.00710 | 33.5 | |
| | 4930.5 | 85.456 | 1.4 | 0.00710 | 34.0 | |
| | 4965.0 | 85.446 | 1.4 | 0.00710 | 34.5 | |
| SCAN BACKWARD | 5000.0 | 85.435 | 1.4 | 0.00710 | 35.0 | 35.5 |
| | 5035.5 | 85.425 | 1.4 | 0.00710 | | 36.0 |
| | 5071.4 | 85.415 | 1.4 | 0.00710 | | 36.5 |
| | 5107.9 | 85.404 | 1.4 | 0.00710 | | 37.0 |
| | 5145.0 | 85.394 | 1.4 | 0.00710 | | 37.6 |
| | 5182.5 | 85.384 | 1.4 | 0.00710 | | 38.1 |
| | 5220.6 | 85.374 | 1.4 | 0.00710 | | 38.7 |
| | 5259.3 | 85.363 | 1.4 | 0.00710 | | 39.3 |
| | 5298.6 | 85.353 | 1.4 | 0.00710 | | 39.8 |
| | 5338.4 | 85.343 | 1.4 | 0.00710 | | 40.5 |
| | 5378.9 | 85.333 | 1.4 | 0.00710 | | 41.1 |
| | 5419.9 | 85.322 | 1.4 | 0.00710 | | 41.7 |
| | 5461.6 | 85.312 | 1.4 | 0.00710 | | 42.3 |
| | 5504.0 | 85.302 | 1.4 | 0.00710 | | 43.0 |
| | 5547.0 | 85.292 | 1.4 | 0.00710 | | 43.7 |
| | 5590.7 | 85.281 | 1.4 | 0.00710 | | 44.4 |
| | 5635.1 | 85.271 | 1.4 | 0.00710 | | 45.1 |
| | 5680.2 | 85.261 | 1.4 | 0.00710 | | 45.8 |

FIG. 25A

| No. | SINUSOIDAL WAVE DRIVING | POSITION OF IMAGE SENSOR [mm] | IN-FOCUS SUBJECT DISTANCE [mm] | IN-FOCUS POSITION CHANGE AMOUNT [mm] |
|---|---|---|---|---|
| 0 | 0.00 | 85.435 | 5000.0 | |
| 1 | 0.09 | 85.443 | 4972.1 | 27.9 |
| 2 | 0.18 | 85.452 | 4944.8 | 27.3 |
| 3 | 0.26 | 85.460 | 4918.2 | 26.6 |
| 4 | 0.35 | 85.467 | 4892.5 | 25.7 |
| 5 | 0.43 | 85.475 | 4867.9 | 24.6 |
| 6 | 0.51 | 85.482 | 4844.6 | 23.4 |
| 7 | 0.58 | 85.489 | 4822.6 | 22.0 |
| 8 | 0.65 | 85.495 | 4802.2 | 20.4 |
| 9 | 0.71 | 85.501 | 4783.4 | 18.8 |
| 10 | 0.77 | 85.507 | 4766.4 | 17.0 |
| 11 | 0.83 | 85.512 | 4751.2 | 15.2 |
| 12 | 0.87 | 85.516 | 4737.9 | 13.2 |
| 13 | 0.91 | 85.520 | 4726.7 | 11.2 |
| 14 | 0.95 | 85.523 | 4717.5 | 9.2 |
| 15 | 0.97 | 85.525 | 4710.5 | 7.1 |
| 16 | 0.99 | 85.527 | 4705.6 | 4.9 |
| 17 | 1.00 | 85.528 | 4702.9 | 2.7 |
| 18 | 1.00 | 85.528 | 4702.3 | 0.5 |
| 19 | 0.99 | 85.527 | 4703.9 | 1.6 |
| 20 | 0.98 | 85.526 | 4707.8 | 3.8 |
| 21 | 0.96 | 85.524 | 4713.8 | 6.0 |
| 22 | 0.93 | 85.521 | 4721.9 | 8.1 |
| 23 | 0.89 | 85.518 | 4732.1 | 10.2 |
| 24 | 0.85 | 85.514 | 4744.3 | 12.2 |
| 25 | 0.80 | 85.509 | 4758.5 | 14.2 |
| 26 | 0.75 | 85.504 | 4774.7 | 16.1 |
| 27 | 0.68 | 85.499 | 4792.6 | 17.9 |
| 28 | 0.62 | 85.492 | 4812.2 | 19.6 |
| 29 | 0.54 | 85.486 | 4833.4 | 21.2 |
| 30 | 0.47 | 85.479 | 4856.1 | 22.7 |
| 31 | 0.39 | 85.471 | 4880.1 | 24.0 |
| 32 | 0.30 | 85.464 | 4905.2 | 25.2 |
| 33 | 0.22 | 85.456 | 4931.4 | 26.2 |
| 34 | 0.13 | 85.448 | 4958.4 | 27.0 |
| 35 | 0.04 | 85.439 | 4986.0 | 27.6 |
| 36 | −0.04 | 85.431 | 5014.1 | 28.0 |
| 37 | −0.13 | 85.423 | 5042.3 | 28.3 |
| 38 | −0.22 | 85.415 | 5070.6 | 28.2 |

FIG. 25B

| No. | SINUSOIDAL WAVE DRIVING | POSITION OF IMAGE SENSOR [mm] | IN-FOCUS SUBJECT DISTANCE [mm] | IN-FOCUS POSITION CHANGE AMOUNT [mm] |
|---|---|---|---|---|
| 39 | -0.30 | 85.407 | 5098.5 | 28.0 |
| 40 | -0.39 | 85.399 | 5126.1 | 27.5 |
| 41 | -0.47 | 85.392 | 5152.9 | 26.8 |
| 42 | -0.54 | 85.385 | 5178.7 | 25.8 |
| 43 | -0.62 | 85.378 | 5203.3 | 24.6 |
| 44 | -0.68 | 85.372 | 5226.5 | 23.2 |
| 45 | -0.75 | 85.366 | 5248.1 | 21.5 |
| 46 | -0.80 | 85.361 | 5267.8 | 19.7 |
| 47 | -0.85 | 85.357 | 5285.4 | 17.6 |
| 48 | -0.89 | 85.353 | 5300.7 | 15.3 |
| 49 | -0.93 | 85.349 | 5313.6 | 12.9 |
| 50 | -0.96 | 85.347 | 5324.0 | 10.4 |
| 51 | -0.98 | 85.345 | 5331.7 | 7.7 |
| 52 | -0.99 | 85.343 | 5336.6 | 4.9 |
| 53 | -1.00 | 85.343 | 5338.7 | 2.1 |
| 54 | -1.00 | 85.343 | 5338.0 | 0.7 |
| 55 | -0.99 | 85.344 | 5334.5 | 3.5 |
| 56 | -0.97 | 85.345 | 5328.2 | 6.3 |
| 57 | -0.95 | 85.348 | 5319.1 | 9.0 |
| 58 | -0.91 | 85.351 | 5307.5 | 11.7 |
| 59 | -0.87 | 85.354 | 5293.3 | 14.1 |
| 60 | -0.83 | 85.359 | 5276.8 | 16.5 |
| 61 | -0.77 | 85.364 | 5258.2 | 18.7 |
| 62 | -0.71 | 85.369 | 5237.5 | 20.6 |
| 63 | -0.65 | 85.375 | 5215.1 | 22.4 |
| 64 | -0.58 | 85.382 | 5191.2 | 24.0 |
| 65 | -0.51 | 85.388 | 5165.9 | 25.3 |
| 66 | -0.43 | 85.396 | 5139.6 | 26.3 |
| 67 | -0.35 | 85.403 | 5112.4 | 27.2 |
| 68 | -0.26 | 85.411 | 5084.6 | 27.8 |
| 69 | -0.18 | 85.419 | 5056.4 | 28.1 |
| 70 | -0.09 | 85.427 | 5028.2 | 28.3 |
| 71 | 0.00 | 85.435 | 5000.0 | 28.2 |
| 72 | 0.09 | 85.443 | 4972.1 | 27.9 |
| 73 | 0.18 | 85.452 | 4944.8 | 27.3 |
| 74 | 0.26 | 85.460 | 4918.2 | 26.6 |
| 75 | 0.35 | 85.467 | 4892.5 | 25.7 |
| 76 | 0.43 | 85.475 | 4867.9 | 24.6 |

IMAGING APPARATUS AND MOBILE IMAGING APPARATUS

CROSS-REFERENCE TO RELATED APPLICATIONS

This application is a Continuation of PCT International Application No. PCT/JP2018/021186 filed on Jun. 1, 2018, which claims priority under 35 U.S.C § 119(a) to Japanese Patent Application No. 2017-121362 filed on Jun. 21, 2017. Each of the above application(s) is hereby expressly incorporated by reference, in its entirety, into the present application.

BACKGROUND OF THE INVENTION

1. Field of the Invention

The present invention relates to an imaging apparatus and a mobile imaging apparatus. In particular, the present invention relates to an imaging apparatus and a mobile imaging apparatus capable of simultaneously capturing two images on the same axis by using an imaging lens in which two optical systems are disposed concentrically and an image sensor having directivity.

2. Description of the Related Art

There is a known imaging apparatus that simultaneously captures two images having different imaging characteristics by using an imaging lens in which two optical systems having different imaging characteristics are disposed concentrically. For example, JP2016-012786A describes an imaging apparatus that simultaneously captures two wide-angle and telephoto images on the same axis by using an imaging lens in which a wide-angle optical system and a telephoto optical system are concentrically disposed and an image sensor having directivity. JP2011-505022A describes an imaging apparatus in which wide-angle and telephoto optical systems are disposed concentrically and which simultaneously captures two wide-angle and telephoto images by separately receiving light from each optical system through two image sensors.

However, in such an imaging apparatus having substantially two optical systems, it is necessary to adjust a focal point for each optical system. In JP2016-012786A, each optical system comprises a focus adjustment mechanism such that the focal point can be adjusted for each optical system. In JP2011-505022A, the focal point of each optical system can be individually adjusted by moving each image sensor relative to each optical system. JP2016-012786A also proposes that only the telephoto optical system comprises the focus adjustment mechanism and that the wide-angle optical system uses pan focus (also referred to as deep focus) of a fixed focal point.

SUMMARY OF THE INVENTION

However, in a case where each optical system comprises the focus adjustment mechanism, there is a problem in that the configuration of the imaging apparatus is complicated and the size thereof becomes large.

On the other hand, in the configuration in which only the telephoto optical system comprises the focus adjustment mechanism, it is possible to simplify the overall configuration as compared with the configuration in which the individual focus adjustment mechanisms are provided, but there are problems in terms of reduction in size and reduction in weight. That is, the telephoto optical system is composed of the outer optical system of the two optical systems disposed concentrically, but the outer optical system is larger and heavier than the inner optical system. Such a large and heavy optical system also has a large and heavy focus adjustment mechanism. For this reason, there is a problem in that an imaging apparatus becomes large and heavy. In addition, in order to operate the optical system at higher speed, a larger actuator is necessary, and thus there is a problem in that an increase in speed is limited. Further, a large and heavy optical system has a problem in that vibration is likely to occur during the focus adjustment operation.

The present invention has been made in view of such situations, and an object thereof is to provide an imaging apparatus and a mobile imaging apparatus capable of reducing the size and weight of the structure relating to focus adjustment.

Means for solving the above problems are as follows.

(1) An imaging apparatus comprising: a central optical system that is set to capture an image with pan focus; an annular optical system that is disposed concentrically with the central optical system; an image sensor that has pixels which selectively receive light passing through the central optical system and pixels which selectively receive light passing through the annular optical system, wherein the pixels which selectively receive light passing through the central optical system and the pixels which selectively receive light passing through the annular optical system are being regularly arranged to be coplanar, and that simultaneously captures an image to be formed through the central optical system and an image to be formed through the annular optical system; and an annular optical system focus adjustment mechanism that adjusts a focal point of the annular optical system by integrally moving the central optical system and the image sensor along the optical axis with respect to the annular optical system.

According to the present aspect, as an imaging apparatus that simultaneously captures two images on the same axis, the imaging apparatus comprises the two optical systems disposed concentrically and the image sensor having directivity. The two optical systems are composed of an inner central optical system and an outer annular optical system. The central optical system is set to capture an image with pan focus. Therefore, focus adjustment is not necessary for the central optical system. On the other hand, the focal point of the annular optical system is adjusted by the annular optical system focus adjustment mechanism. The annular optical system focus adjustment mechanism adjusts the focal point of the annular optical system by moving the central optical system and the image sensor integrally along the optical axis. Since the inner central optical system is smaller and lighter than the outer annular optical system, the structure necessary for the movement can be reduced in weight and size. Further, the central optical system is small and light, and thus can be operated at high speed. Thereby, the focus adjustment operation of the annular optical system can be speeded up. Furthermore, the central optical system is small and lightweight, and thus can be operated without occurrence of vibration. Moreover, since the central optical system is moved integrally with the image sensor, the focal point of the central optical system does not fluctuate. The "annular optical system" of the present invention includes a circular optical system as well as a complete annular optical system. That is, the optical system disposed concentrically on the outer periphery of the central optical system is an annular optical system. Further, the term "concentrically" is defined to include not only a case where the optical axes completely coincide but also a case where the optical axes substantially coincide. That is, the term is defined to include a range that can be regarded as a substantially concentric shape.

(2) The imaging apparatus according to (1), in which the annular optical system has a focal length longer than a focal length of the central optical system.

According to the present aspect, the annular optical system is composed of an optical system having a focal length longer than that of the central optical system. Thereby, two images with different focal lengths can be simultaneously captured on the same axis. In particular, since the central optical system is composed of a short-focus optical system, pan focus can be easily realized.

(3) The imaging apparatus according to (2), in which the central optical system is composed of a wide-angle optical system, and the annular optical system is composed of a telephoto optical system.

According to the present aspect, the central optical system is composed of the wide-angle optical system, and the annular optical system is composed of the telephoto optical system. Thereby, two wide-angle and telephoto images can be simultaneously captured on the same axis. Here, the wide-angle optical system refers to an optical system that has a wider angle of view (approximately 60° or more) than a standard optical system (with an angle of view of around 50°) and is able to image a wide range. On the other hand, the telephoto optical system is an optical system that has an optical system having a longer focal length than a standard optical system and that is capable of imaging a long-distance subject in an enlarged manner.

(4) The imaging apparatus according to (3), in which the annular optical system is composed of a catadioptric system.

According to the present aspect, the annular optical system is composed of a catadioptric system. The catadioptric system is an optical system in which a lens and a mirror are combined. By adopting the configuration using the catadioptric system, the annular optical system can be reduced in weight and size. Thereby, the whole structure can also be reduced in size and weight.

(5) The imaging apparatus according to (1), in which the central optical system is set to capture an image at a long range, and the annular optical system is set to capture an image at a short range.

According to the present aspect, the central optical system is composed of an optical system which is set to capture an image at a long range, and the annular optical system is composed of an optical system which is set to capture an image at a short range. Thereby, two images at the short range and the long range can be simultaneously captured on the same axis. The depth of field increases as the distance to the subject increases. Therefore, a long-distance subject can be imaged with pan focus. On the other hand, it is difficult to image a short-distance subject with pan focus. Therefore, a long-distance subject is imaged by a pan-focus central optical system, and a short-distance subject is imaged by an annular optical system having a focus adjustment function. Thereby, images focused at both the short range and the long range can be simultaneously captured. Here, the terms "long range" and "short range" are relationships determined between the central optical system and the annular optical system. That is, the central optical system is set to image a short-distance subject with respect to the annular optical system, and the annular optical system is set to image a long-distance subject with respect to the central optical system. However, a distance, at which imaging can be performed with pan focus because of imaging with pan focus, is set for the central optical system. For example, in a case of ranging from a wide angle to a standard angle of view (approximately 50° or more), the central optical system is set to perform imaging in a range of 3 m to infinity.

(6) The imaging apparatus according to any one of (1) to (5), further comprising: an imaging controller that causes the image sensor to capture a video or continuously capture still images; and an annular optical system focus adjustment controller that controls the annular optical system focus adjustment mechanism. The annular optical system focus adjustment controller periodically displaces the central optical system and the image sensor during imaging, and periodically changes a distance of a subject which is brought into focus through the annular optical system.

According to the present aspect, a video is captured while the distance of the subject which is brought into focus through the annular optical system is periodically changed. Alternatively, still images are continuously captured while the distance of the subject which is brought into focus through the annular optical system is periodically changed. For example, the central optical system and the image sensor are periodically displaced between a position at which a subject at the closest distance (MOD: Minimum Object Distance) is brought into focus and a position at which a subject at infinity is brought into focus, thereby periodically changing the distance of the subject which is brought into focus through the annular optical system. An image focused by the annular optical system can be easily captured.

(7) The imaging apparatus according to (6), in which the annular optical system focus adjustment controller displaces the central optical system and the image sensor in a sinusoidal wave manner.

According to the present aspect, a video is captured by displacing the central optical system and the image sensor in a sinusoidal wave manner. Alternatively, the still images are continuously captured by displacing the central optical system and the image sensor in a sinusoidal wave manner.

(8) The imaging apparatus according to (6), in which the annular optical system focus adjustment controller displaces the central optical system and the image sensor in a sawtooth wave manner.

According to the present aspect, a video is captured by displacing the central optical system and the image sensor in a sawtooth wave manner. Alternatively, the central optical system and the image sensor are displaced in a sawtooth wave manner, and still images are continuously captured.

(9) The imaging apparatus according to any one of (6) to (8), further comprising an annular optical system in-focus image extraction section that analyzes a video or a group of the still images captured through the annular optical system for each period of displacement of the central optical system and the image sensor, and that extracts a frame image with a highest sharpness or a still image with a highest sharpness as an annular optical system in-focus image for each period of displacement.

According to the present aspect, the video captured through the annular optical system is analyzed for each period of displacement of the central optical system and the image sensor, and the frame image with the highest sharpness is extracted as the annular optical system in-focus image for each period of displacement. Alternatively, a group of still images captured through the annular optical system is analyzed for each displacement period of the central optical system and the image sensor, and the still image with the highest sharpness is extracted as the annular optical system in-focus image for each period of displacement.

(10) The imaging apparatus according to (9), further comprising a central optical system in-focus image extraction section that extracts a frame image or a still image captured at the same timing as the annular optical system in-focus image, as a central optical system in-focus image, from a video or group of the still images captured through the central optical system.

According to the present aspect, the frame image or the still image captured at the same timing as the annular optical system in-focus image is extracted as the central optical system in-focus image. The "same timing" described herein includes substantially the same timing.

(11) A mobile imaging apparatus comprising: the imaging apparatus according to any one of (1) to (10); and a moving body on which the imaging apparatus is mounted.

According to the present aspect, the mobile imaging apparatus is configured by mounting the imaging apparatus according to any one of (1) to (10) on the moving body. The moving body can be composed of, for example, an unmanned aircraft (so-called drone), an autonomous driving vehicle, or the like.

According to the present invention, the structure relating to focus adjustment can be reduced in weight and size. Thereby, it is possible to increase the speed of the focus adjustment. Further, vibration during operation can be prevented.

BRIEF DESCRIPTION OF THE DRAWINGS

FIG. 7 is a diagram showing a schematic configuration of an image sensor.

FIG. 17 is a table showing a relationship between a position of the image sensor and an in-focus subject distance of the annular optical system in the imaging apparatus shown in FIG. 1.

FIGS. 19A and 19B each are a table showing the relationship between the position of the image sensor and the in-focus subject distance of the annular optical system in a case where the image sensor is displaced in a sawtooth wave manner.

FIGS. 21A and 21B each are a table showing the relationship between the position of the image sensor and the in-focus subject distance of the annular optical system in a case where the image sensor is displaced in a sinusoidal wave manner.

FIG. 23 is a table showing a relationship between a position of the image sensor and an in-focus subject distance of the annular optical system in the imaging apparatus shown in FIG. 1.

FIGS. 25A and 25B each are a table showing the relationship between the position of the image sensor and the in-focus subject distance of the annular optical system in a case where the image sensor is displaced in a sinusoidal wave manner.

DESCRIPTION OF THE PREFERRED EMBODIMENTS

Hereinafter, preferred embodiments of the present invention will be described in detail with reference to the accompanying drawings.

Imaging Apparatus

[Configuration of Imaging Apparatus]

Figure 1:
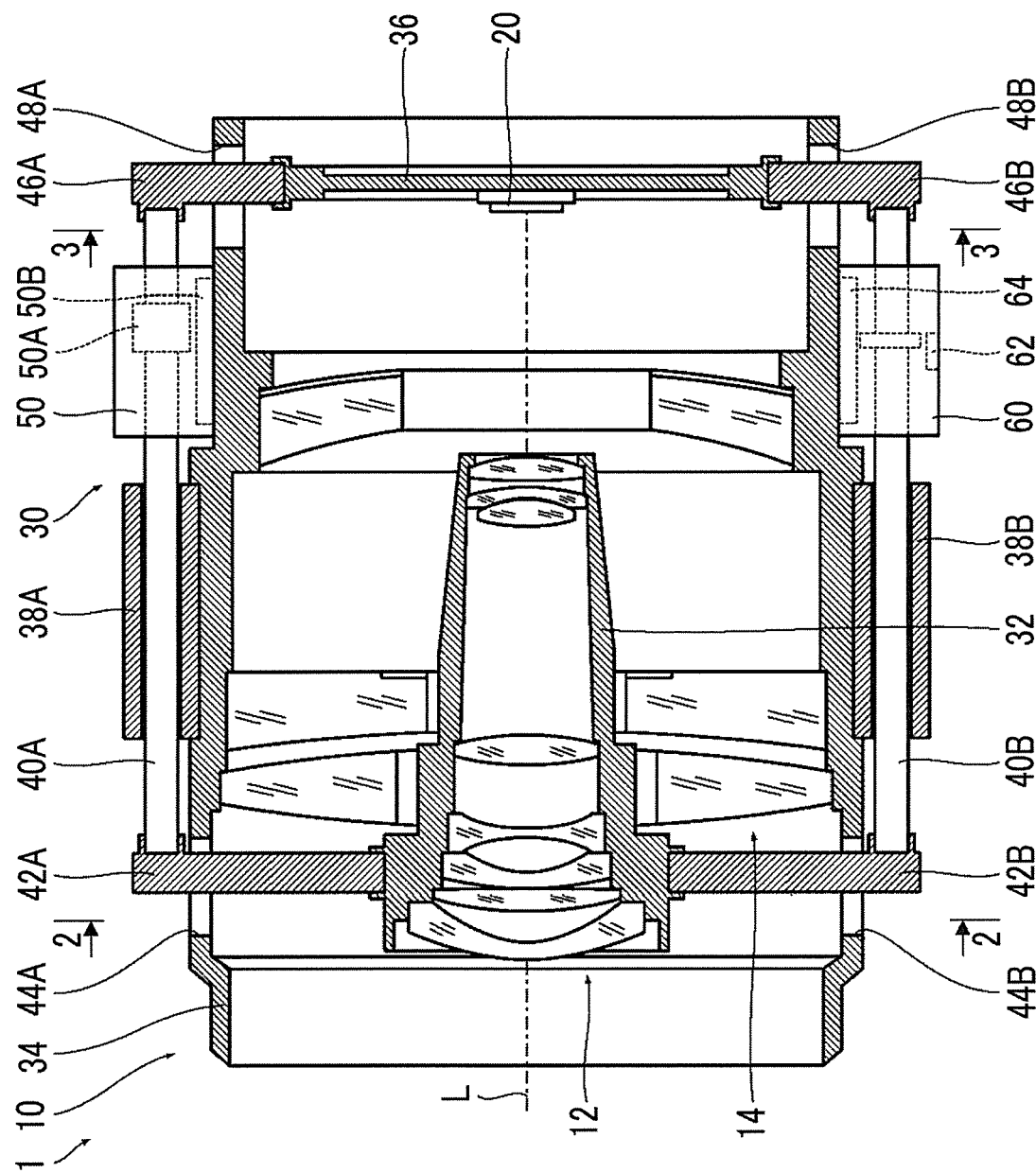
FIG. 1 is a cross-sectional view showing a schematic configuration of an embodiment of an imaging apparatus to which the present invention is applied.
Figure 2:
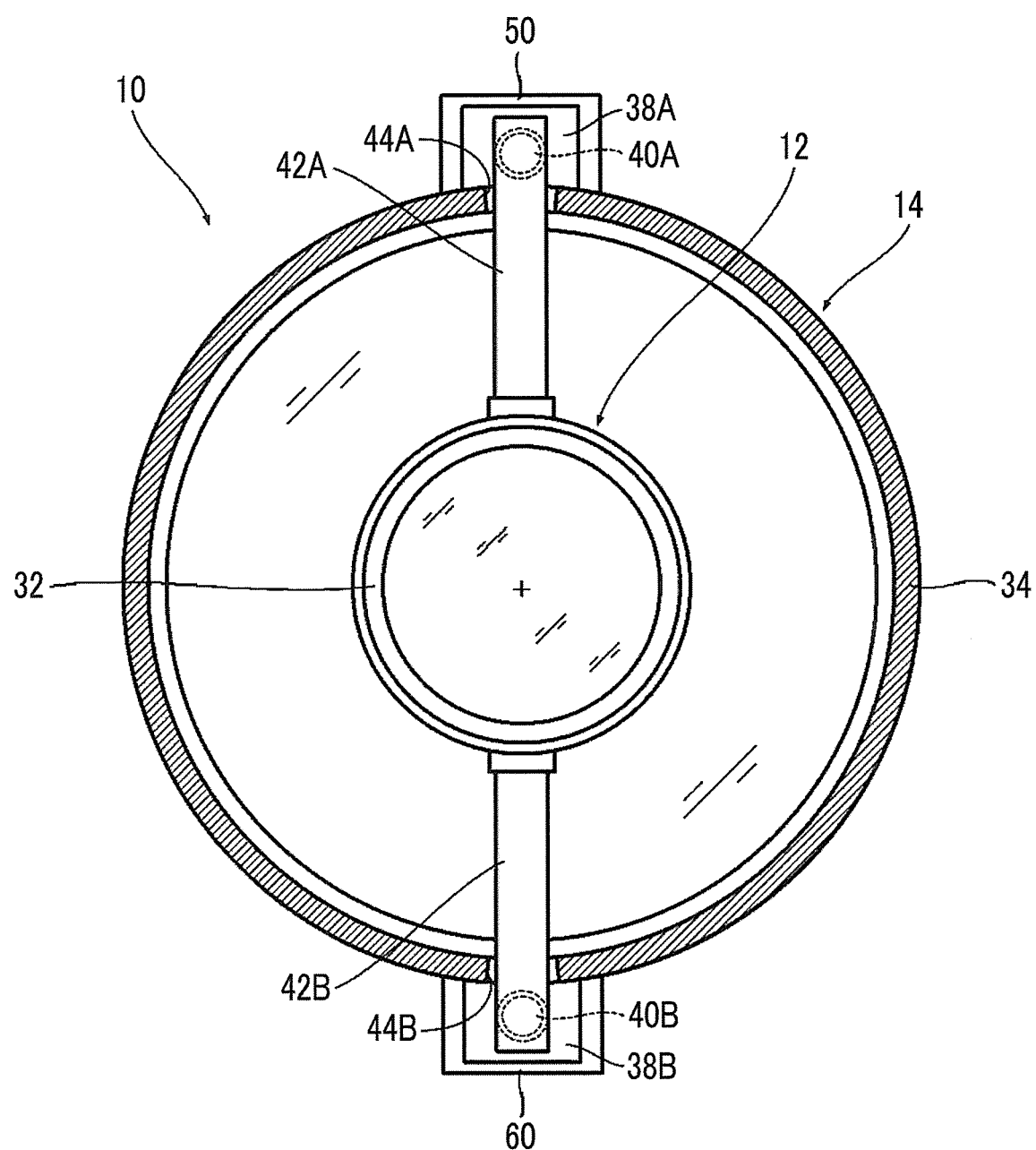
FIG. 2 is a cross-sectional view taken along line 2-2 in FIG. 1.
Figure 3:
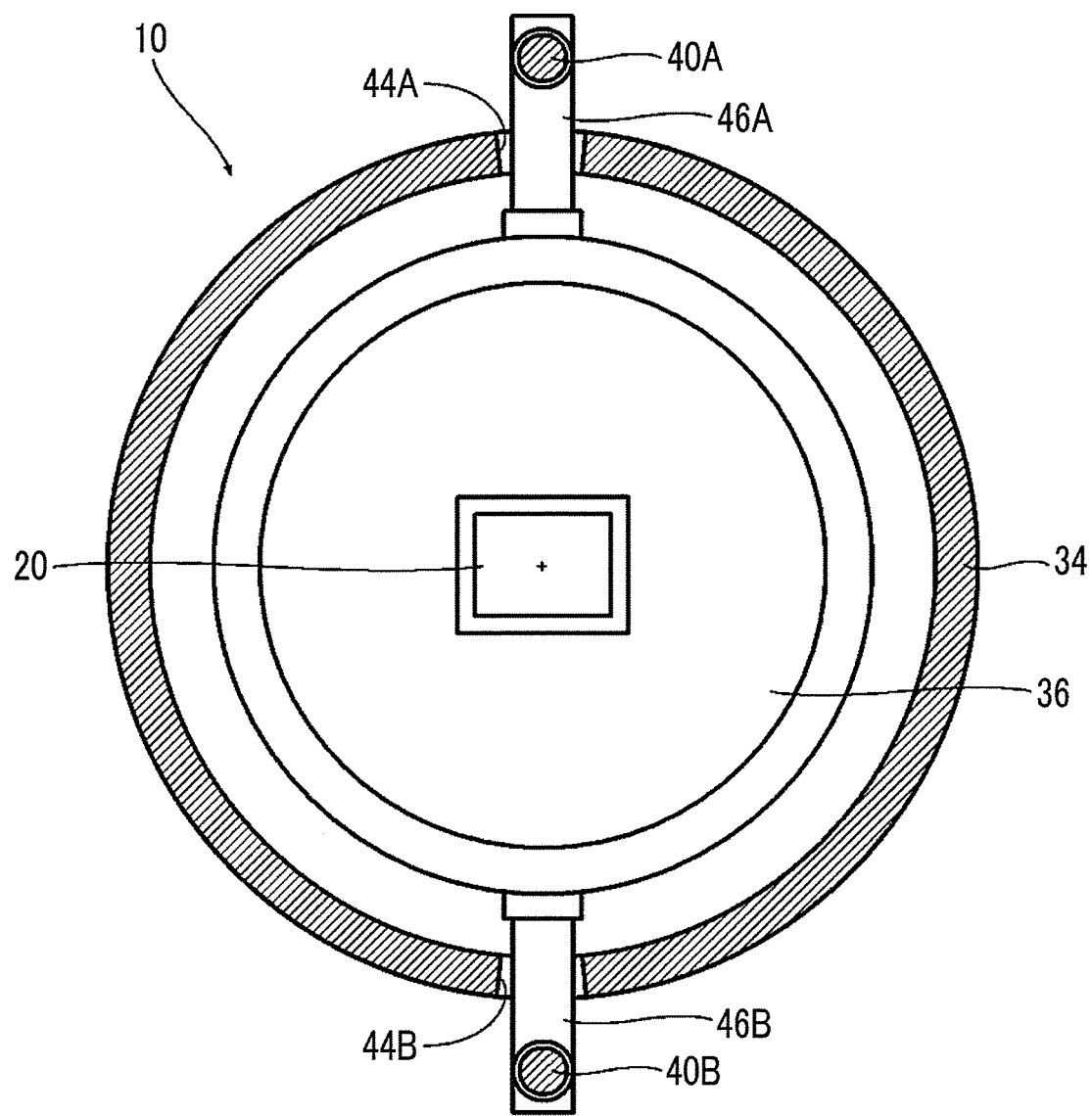
FIG. 3 is a cross-sectional view taken along line 3-3 in FIG. 1.

FIG. 1 is a cross-sectional view showing a schematic configuration of an embodiment of an imaging apparatus to which the present invention is applied. Further, FIG. 2 is a cross-sectional view taken along the line 2-2 in FIG. 1, and FIG. 3 is a cross-sectional view taken along the line 3-3 in FIG. 1.

The imaging apparatus 1 according to the present embodiment is an imaging apparatus that simultaneously images two wide-angle and telephoto images on the same axis, and is configured to comprise an imaging lens 10 having two wide-angle and telephoto optical systems, and an image sensor 20 having directivity. It should be noted that "the same axis" is defined to include a range that can be regarded as substantially the same axis, and "the same time" is defined to include a substantially simultaneous range.

<<Imaging Lens>>

The imaging lens 10 comprises a central optical system 12 that composes a wide-angle optical system, an annular optical system 14 that composes a telephoto optical system, and an annular optical system focus adjustment mechanism 30 that adjusts the focal point of the annular optical system 14.

<Central Optical System>

Figure 4:
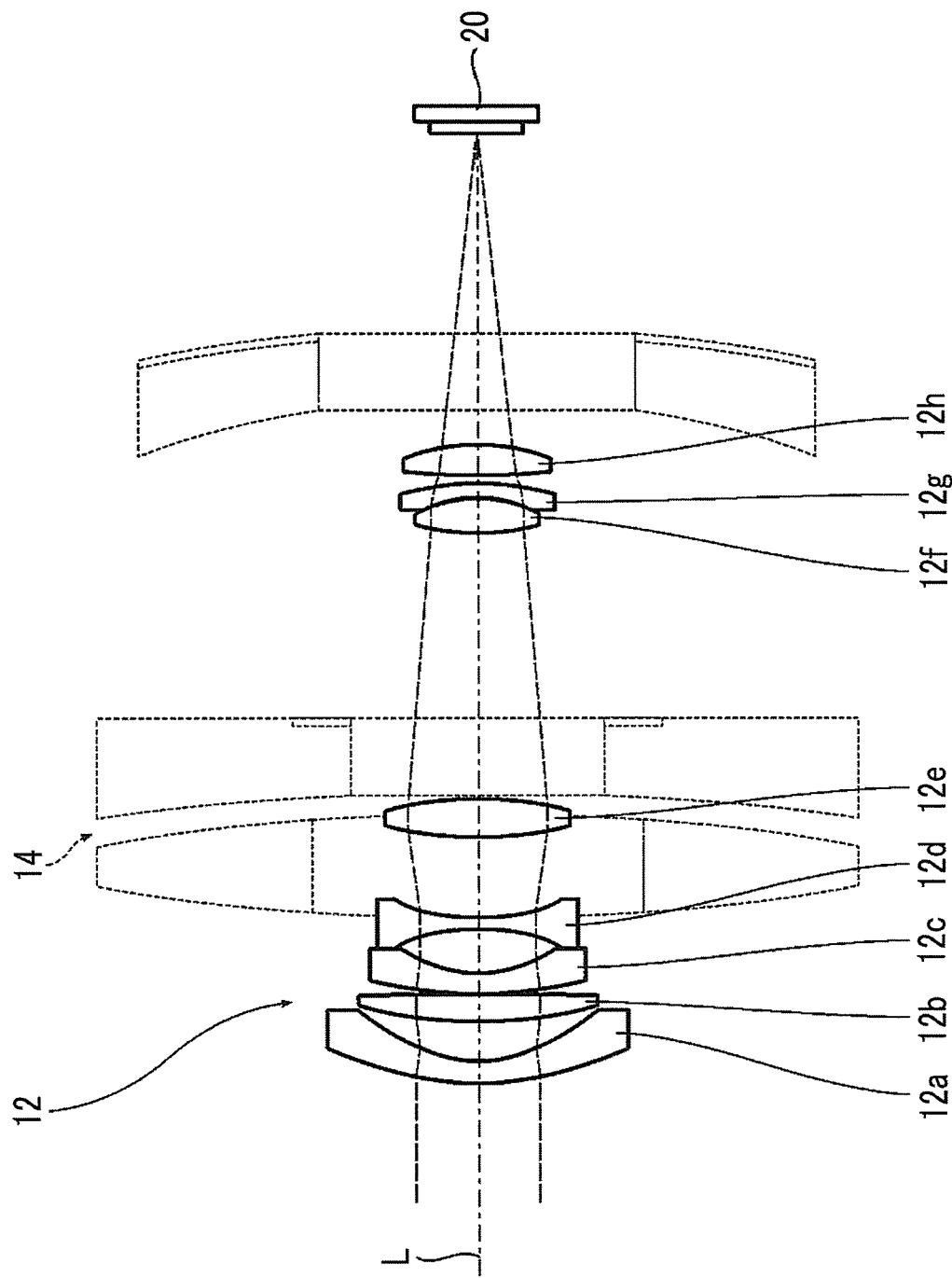
FIG. 4 is a diagram showing a lens configuration of a central optical system.

FIG. 4 is a diagram showing a lens configuration of the central optical system.

The central optical system 12 is composed of eight lenses 12a to 12h as a fixed focus optical system. The lenses 12a to 12h are arranged along an optical axis L. The light incident on the central optical system 12 is incident on the image sensor 20 through the lenses 12a to 12h.

The central optical system 12 is set to capture an image with pan focus. The central optical system 12 comprises a stop which is not shown in the optical path thereof. The central optical system 12 realizes pan focus by setting the stop. In other words, the stop is set in the central optical system 12 so as to perform pan focus.

<Annular Optical System>

The annular optical system 14 is disposed concentrically with the central optical system 12. Therefore, the annular optical system 14 is an optical system having the optical axis L the same as that of the central optical system 12 and is an optical system that is able to capture an image on the same axis as that of the central optical system 12.

Figure 5:
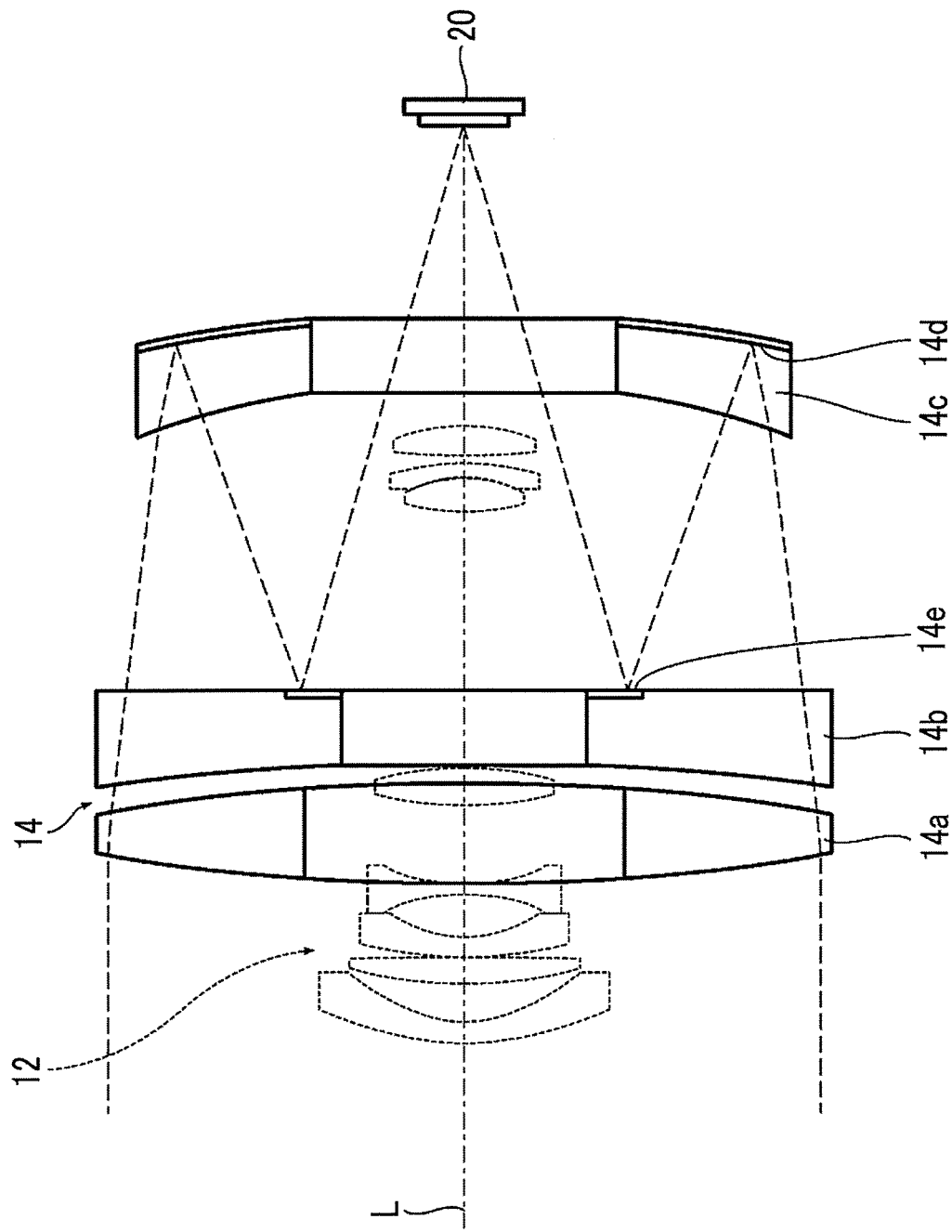
FIG. 5 is a diagram showing a lens configuration of an annular optical system.

FIG. 5 is a diagram showing a lens configuration of the annular optical system.

The annular optical system 14 is composed of a catadioptric system, and is formed by combining three lenses 14a, 14b, and 14c and two mirrors 14d and 14e.

The three lenses 14a, 14b, and 14c each have an annular shape and are arranged along the optical axis L. The three lenses 14a, 14b, and 14c are referred to as a first lens 14a, a second lens 14b, and a third lens 14c in order from the subject side.

The two mirrors 14d and 14e are composed of a primary mirror 14d and a secondary mirror 14e. The primary mirror 14d is provided on the image plane side surface of the third lens 14c. The primary mirror 14d is provided on the entire image plane side surface of the third lens 14c, for example, by performing mirror processing on the entire image plane side surface of the third lens 14c. The secondary mirror 14e is provided on the image plane side surface of the second lens 14b. The secondary mirror 14e is formed in a ring shape on the inner side portion of the image plane side surface of the second lens 14b, for example, by performing mirror processing on the inner side portion of the image plane side surface of the second lens 14b in a ring shape.

The light incident on the annular optical system 14 passes through the first lens 14a, the second lens 14b, and the third lens 14c in this order, and is reflected by the primary mirror 14d. The light reflected by the primary mirror 14d is incident on the secondary mirror 14e through the third lens 14c, is reflected by the secondary mirror 14e, and is incident on the image sensor 20.

The annular optical system 14 comprises a stop which is not shown in the optical path thereof. The stop adjusts the amount of light passing through the annular optical system 14 by expanding and contracting the outer diameter thereof.

<<Annular Optical System Focus Adjustment Mechanism>>

The annular optical system focus adjustment mechanism 30 adjusts the focal point of the annular optical system 14 by moving the central optical system 12 and the image sensor 20 integrally along the optical axis L.

As shown in FIG. 1, the annular optical system focus adjustment mechanism 30 is configured to comprise a fixed cylinder 32, a moving cylinder 34, an image sensor holder 36, a linear guide mechanism, an actuator 50, and a position detection unit 60.

<Fixed Cylinder>

The fixed cylinder 32 is fixedly disposed on a body frame which is not shown in the imaging apparatus 1. The fixed cylinder 32 holds the annular optical system 14. The lenses 14a, 14b, and 14c composing the annular optical system 14 are positioned and mounted inside the fixed cylinder 32, respectively.

<Moving Cylinder>

The moving cylinder 34 is disposed inside the fixed cylinder 32 and is disposed on the same axis as that of the fixed cylinder 32. The moving cylinder 34 holds the central optical system 12. The lenses 12a to 12h composing the central optical system 12 are positioned and mounted inside the moving cylinder 34, respectively.

<Image Sensor Holder>

The image sensor holder 36 holds the image sensor 20. The image sensor holder 36 has a disk shape, and holds the image sensor 20 in the center thereof. The image sensor holder 36 is disposed inside the fixed cylinder 32 and is disposed on the same axis as that of the fixed cylinder 32. The image sensor 20 is held by the image sensor holder 36 and disposed on the optical axis L.

<Linear Guide Mechanism>

The linear guide mechanism performs linear guide such that the central optical system 12 and the image sensor 20 move integrally along the optical axis L.

The linear guide mechanism is configured to comprise two linear bushes 38A and 38B and two linear shafts 40A and 40B that are linearly guided by the two linear bushes 38A and 38B.

The two linear bushes 38A are provided on the fixed cylinder 32. The linear bushes 38A each are disposed on the outer peripheral surface of the fixed cylinder 32, and each are disposed to be symmetric with respect to the optical axis L. The linear bushes 38A are disposed in parallel with the optical axis L, respectively.

The two linear shafts 40A and 40B are slidably supported by the corresponding linear bushes 38A and 38B. Accordingly, each of the linear shafts 40A and 40B is disposed in parallel with the optical axis L and slides in parallel with the optical axis L.

The distal ends of the linear shafts 40A and 40B are connected to moving cylinder support arms 42A and 42B, respectively. As shown in FIGS. 1 and 2, each of the moving cylinder support arms 42A and 42B has a bar shape, and the base end thereof is fixed to the outer periphery of the distal end of the moving cylinder 34. The fixed cylinder 32 comprises front slits 44A and 44B through which the moving cylinder support arms 42A and 42B are inserted. The front slits 44A and 44B are provided in parallel with the optical axis L, respectively.

The rear ends of the linear shafts 40A and 40B are connected to holder support arms 46A and 46B, respectively. As shown in FIGS. 1 and 3, each of the holder support arms 46A and 46B has a bar shape, and a base end thereof is fixed to the outer periphery of the image sensor holder 36. The fixed cylinder 32 comprises rear slits 48A and 48B through which the holder support arms 46A and 46B are inserted. The rear slits 48A and 48B are provided in parallel with the optical axis L, respectively.

In the linear guide mechanism configured as described above, in a case where the linear shafts 40A and 40B are slid, the moving cylinder 34 and the image sensor holder 36 move integrally along the optical axis L. Thereby, the central optical system 12 held by the moving cylinder 34 and the image sensor 20 held by the image sensor holder 36 move integrally along the optical axis L.

<Actuator>

The actuator 50 is composed of a linear motor. The linear motor comprises a coil 50A composing a mover and a magnet 50B composing a stator. The coil 50A is mounted on the linear shaft 40A, and the magnet 50B is mounted on the fixed cylinder 32. A magnetic field is generated by passing a current through the coil 50A, and the coil 50A moves linearly. Thereby, the linear shaft 40A moves back and forth along the optical axis L.

In a case where the actuator 50 is driven to move the linear shaft 40A back and forth along the optical axis L, the moving cylinder 34 and the image sensor holder 36 connected to the linear shaft 40A move back and forth integrally along the optical axis L. Thereby, the central optical system 12 and the image sensor 20 move back and forth integrally along the optical axis L with respect to the fixed annular optical system 14.

Figure 6A:
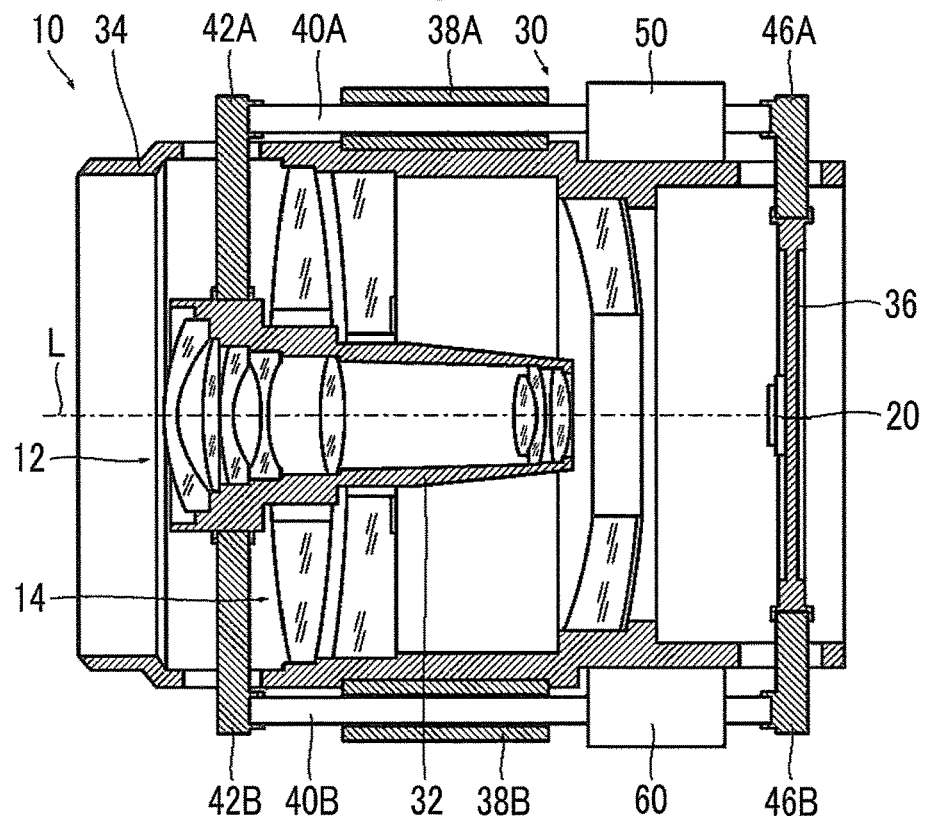
FIGS. 6A and 6B are diagrams showing states of movement of the central optical system and the image sensor.
Figure 6B:
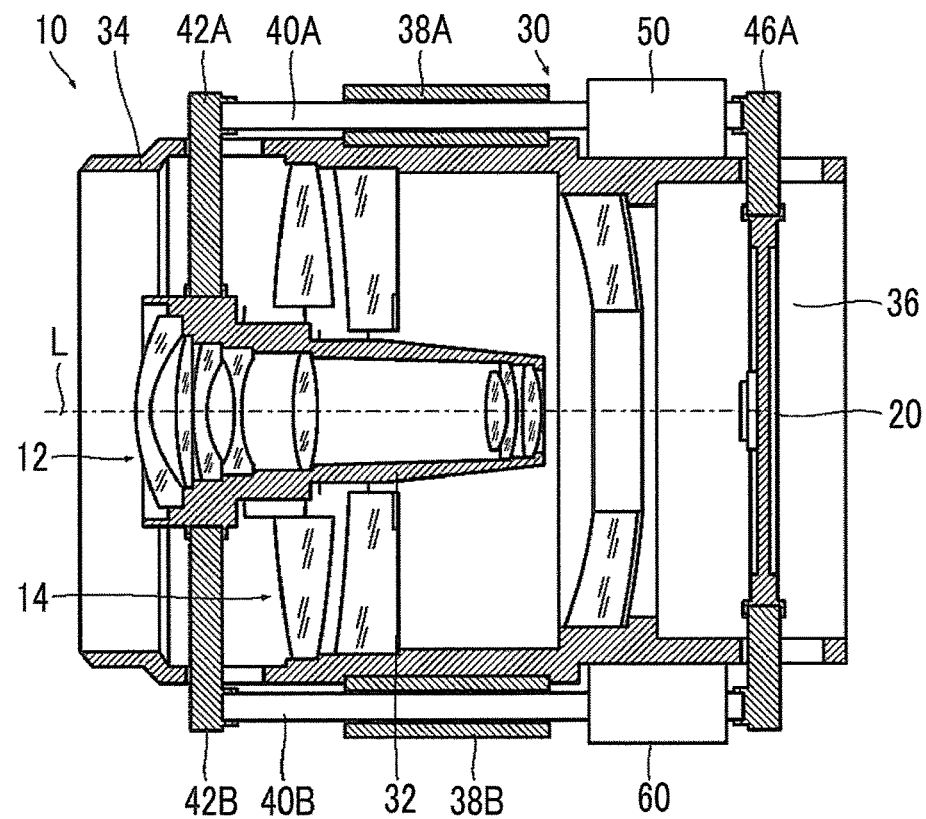

FIGS. 6A and 6B are diagrams showing states of movement of the central optical system and the image sensor. FIG. 6A shows a state in which the central optical system and the image sensor are moved to the image plane side, and FIG. 6B shows a state in which the central optical system and the image sensor are moved to the subject side.

As shown in the drawing, the annular optical system focus adjustment mechanism 30 is able to move the central optical system 12 and the image sensor 20 along the optical axis L with respect to the fixed annular optical system 14. Thereby, the focal point of the annular optical system 14 can be adjusted. That is, since the image sensor 20 can be moved with respect to the fixed annular optical system 14, the focal point of the annular optical system 14 can be adjusted. Further, in relationship to the central optical system 12, the central optical system 12 and the image sensor 20 move integrally. Therefore, the pan focus state set in the central optical system 12 can be maintained.

The annular optical system 14 brings a long-distance subject into focus by moving the central optical system 12 and the image sensor 20 toward the subject side, and brings a short-distance subject into focus by moving the central optical system 12 and the image sensor 20 toward the image plane side.

<Position Detection Unit>

The position detection unit 60 comprises a photo interrupter 62 and a magneto resistive sensor (MR sensor) 64. The photo interrupter 62 detects that the image sensor 20 is positioned at the origin with respect to the annular optical system 14. The position of the origin is set in advance. The MR sensor 64 detects the amount of displacement of the image sensor 20. The photo interrupter 62 detects that the image sensor 20 is positioned at the origin, and the MR sensor 64 detects the amount of displacement from the origin. Thereby, the position of the image sensor 20 with respect to the origin can be detected.

<<Image Sensor>>

The image sensor 20 is composed of a directional image sensor including pixels that selectively receive light passing through the central optical system 12 and pixels that selectively receive light passing through the annular optical system 14, and simultaneously captures the image formed by the central optical system 12 and the image formed by the annular optical system 14.

FIG. 7 is a diagram showing a schematic configuration of the image sensor.

As shown in the drawing, the image sensor 20 includes central optical system light receiving pixels 22a that selectively receive light passing through the central optical system 12, and annular optical system light receiving pixels 22b that selectively receive light passing through the annular optical system 14. The annular optical system light receiving pixels 22b and the central optical system light receiving pixels 22a are regularly arranged to be coplanar. In the example shown in FIG. 7, the central optical system light receiving pixels 22a and the annular optical system light receiving pixels 22b are alternately arranged.

Figure 8:
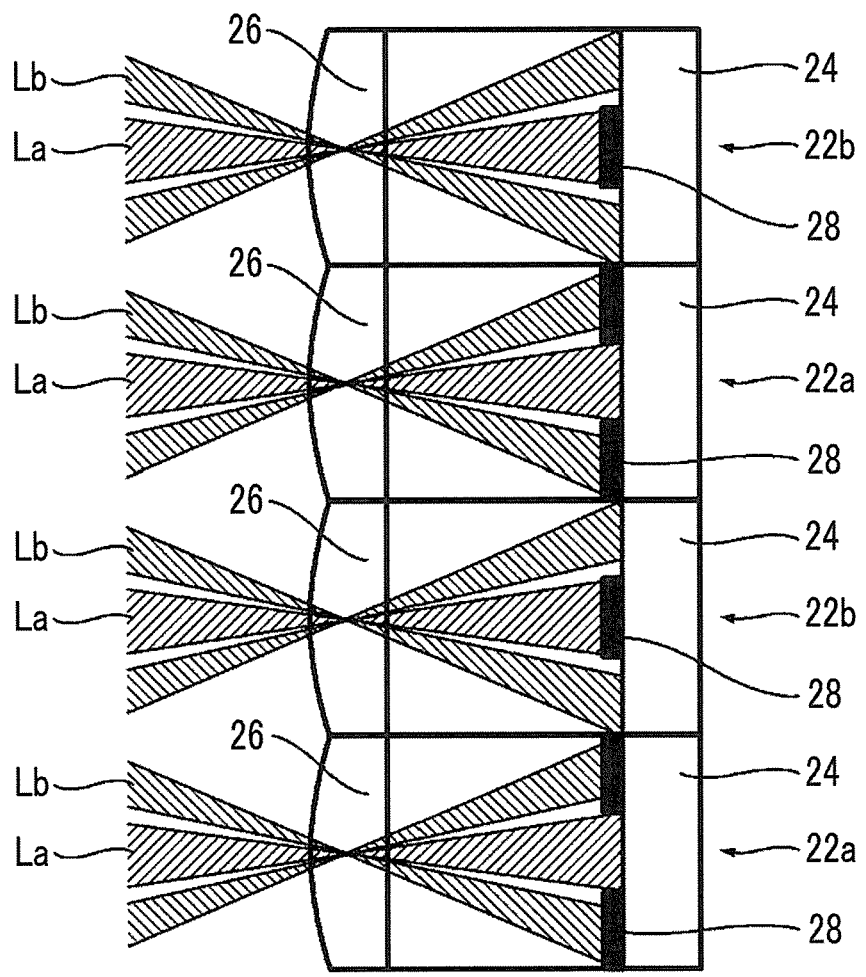
FIG. 8 is a conceptual diagram of a configuration in which each pixel of the image sensor selectively receives light from a corresponding optical system.

FIG. 8 is a conceptual diagram of a configuration in which each pixel of the image sensor selectively receives light from a corresponding optical system.

As shown in the drawing, each pixel is configured to comprise a photodiode 24, a microlens 26, and a light blocking mask 28.

The microlens 26 is disposed in front of the photodiode 24. The microlens 26 forms pupil images of the annular optical system 14 and the central optical system 12 on the photodiode 24.

The light blocking mask 28 is disposed between the microlens 26 and the photodiode 24. The light blocking mask 28 blocks a part of the light passing through the microlens 26. The light blocking mask 28 of the central optical system light receiving pixel 22a has a shape for blocking the light Lb passing through the annular optical system 14, and has a ring shape. The light blocking mask 28 of the annular optical system light receiving pixel 22b has a shape for blocking the light La passing through the central optical system 12, and has a circular shape.

With the above configuration, the central optical system light receiving pixel 22a selectively receives the light La passing through the central optical system 12, and the annular optical system light receiving pixel 22b selectively receives the light Lb passing through the annular optical system 14. Therefore, by acquiring the image signal of the central optical system light receiving pixel 22a, the image signal of the image ImW obtained through the central optical system 12 can be acquired. In addition, by acquiring the image signal of the annular optical system light receiving pixel 22b, the image signal of the image ImT obtained through the annular optical system 14 can be acquired.

In the imaging lens 10 of the present embodiment, the central optical system 12 is composed of a wide-angle optical system, and the annular optical system 14 is composed of a telephoto optical system. Accordingly, the image ImW captured through the central optical system 12 is a wide-angle image, and the image ImT captured through the annular optical system 14 is a telephoto image. The image of each optical system is captured on the same axis. Therefore, the image ImT of the annular optical system 14 becomes an image obtained by enlarging the central portion of the image ImW of the central optical system 12, and becomes an image having no parallax.

In a case of acquiring a color image, the annular optical system light receiving pixels 22b and the central optical system light receiving pixels 22a comprise color filters. The color filters are arranged in a prescribed array. For example, color filters of three colors of red (R), green (G), and blue (B) are arranged in a Bayer array. Thereby, a color image can be acquired.

[Electrical Configuration of Imaging Apparatus]

Figure 9:
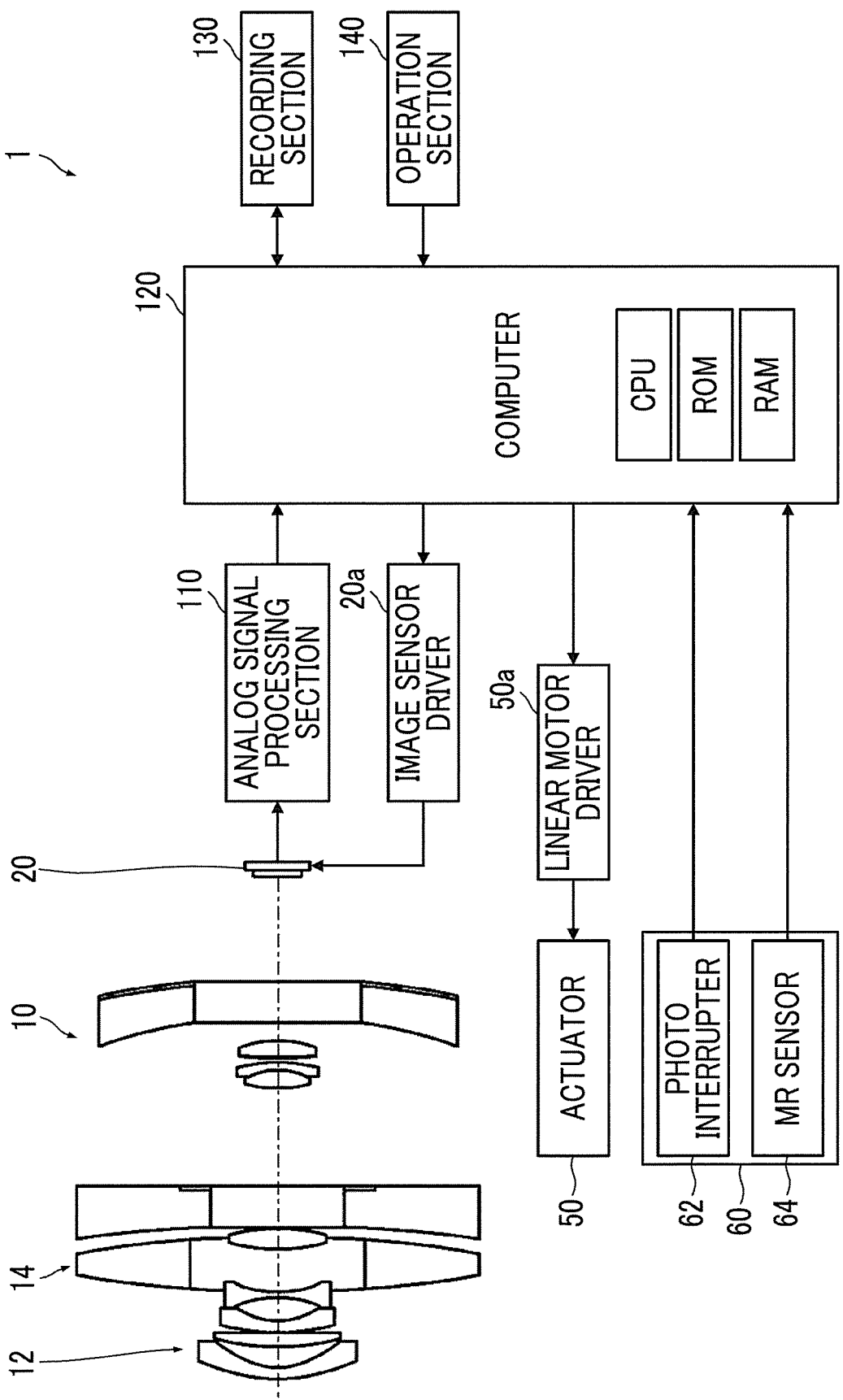
FIG. 9 is a block diagram showing an electrical configuration of the imaging apparatus.

FIG. 9 is a block diagram showing an electrical configuration of the imaging apparatus.

As shown in the drawing, the imaging apparatus 1 comprises an analog signal processing section 110, a computer 120, a recording section 130, an operation section 140, and the like.

<<Analog Signal Processing Section>>

The analog signal processing section 110 loads an analog image signal of each pixel which is output from the image sensor 20, and performs predetermined signal processing (such as correlative double sampling processing, amplification processing, and the like). The analog signal processing section 110 includes an analog-to-digital converter (AD converter), converts an analog image signal after a predetermined signal processing into a digital image signal, and outputs the digital image signal.

<<Computer>>

The computer 120 comprises a central processing unit (CPU), a random access memory (RAM), and a read only memory (ROM), and executes a predetermined program, thereby executing various kinds of processing.

Figure 10:
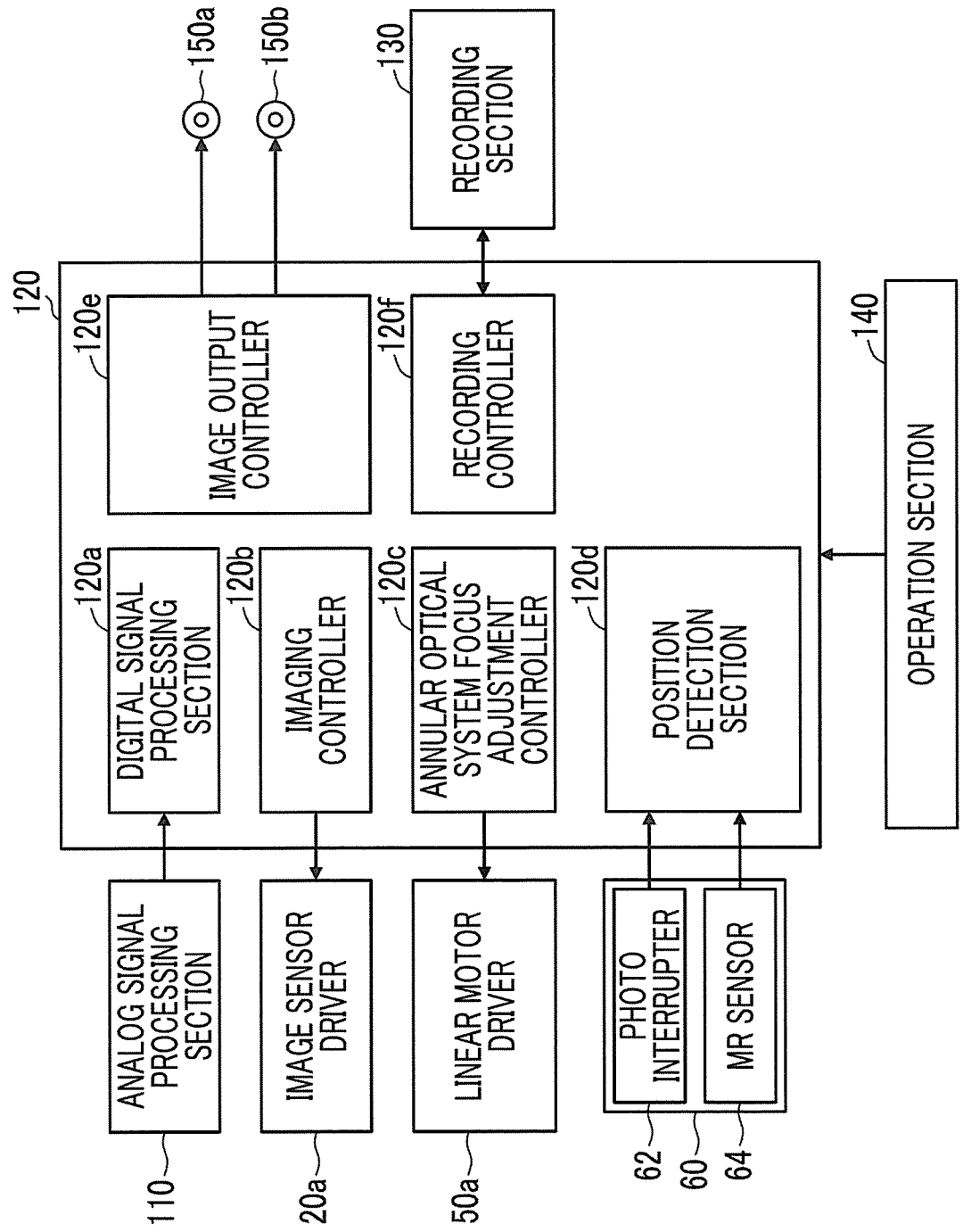
FIG. 10 is a block diagram of main functions implemented by a computer.

FIG. 10 is a block diagram of main functions implemented by the computer.

The computer 120 executes the predetermined program, thereby functioning as a digital signal processing section 120a, an imaging controller 120b, an annular optical system focus adjustment controller 120c, a position detection section 120d, an image output controller 120e, a recording controller 120f, and the like.

<Digital Signal Processing Section>

The digital signal processing section 120a loads the digital image signal which is output from the analog signal processing section 110, and performs predetermined signal processing (such as gradation transformation processing, white balance correction processing, gamma correction processing, synchronization processing, and YC conversion processing), thereby generating image data. At this time, the digital signal processing section 120a generates first image data on the basis of the image signals of the central optical system light receiving pixels 22a of the image sensor 20, and generates second image data on the basis of the image signals of the annular optical system light receiving pixels 22b. The first image data is image data of an image captured through the central optical system 12, and is wide-angle image data. The second image data is image data of an image captured through the annular optical system 14, and is a telephoto image data.

The digital signal processing section 120a detects the brightness of the subject necessary for exposure control on the basis of the loaded image signal.

Further, the digital signal processing section 120a detects an evaluation value necessary for focus adjustment of the annular optical system 14 on the basis of the loaded image signal. For example, the contrast in a predetermined focus area is detected as the focus evaluation value of the annular optical system 14.

<Imaging Controller>

The imaging controller 120b controls imaging through the image sensor 20. The imaging controller 120b controls driving of the image sensor 20 through the image sensor driver 20a, and controls imaging through the image sensor 20.

It should be noted that videos and still images can be captured. The operation section 140 sets which is to be imaged.

In a case of capturing a video, driving of the image sensor 20 is controlled such that the video is captured at a predetermined frame rate.

In a case of capturing a still image, driving of the image sensor 20 is controlled such that the still image is captured with appropriate exposure.

<Annular Optical System Focus Adjustment Controller>

The annular optical system focus adjustment controller 120c controls the focus adjustment of the annular optical system 14. The annular optical system focus adjustment controller 120c controls driving of the actuator 50 through the linear motor driver 50a, and controls the focus adjustment of the annular optical system 14. That is, by controlling the driving of the actuator 50, the position of the image sensor 20 with respect to the annular optical system 14 is controlled, and the focus adjustment of the annular optical system 14 is controlled.

It should be noted that the focus adjustment control of the annular optical system 14 is performed in accordance with the imaging mode. This will be described in detail later.

<Position Detection Section>

The position detection section 120d detects the position of the image sensor 20 on the basis of the outputs of the photo interrupter 62 and the MR sensor 64.

<Image Output Controller>

The image output controller 120e controls output of an image obtained by imaging. The image output controller 120e converts the image data of the central optical system 12 generated by the digital signal processing section 120a into an output format for display and outputs the image data from the central optical system image output terminal 150a. Further, the image data of the annular optical system 14 is converted into an output format for display and is output from the annular optical system image output terminal 150b. For example, a monitor is connected to the central optical system image output terminal 150a and the annular optical system image output terminal 150b, and an image obtained by imaging is displayed on the monitor.

<Recording Controller>

The recording controller 120f controls recording of an image obtained by imaging. The recording controller 120f converts the image data of the central optical system 12 and the image data of the annular optical system 14 generated by the digital signal processing section 120a into a recording data format and records the data in the recording section 130.

<<Recording Section>>

The recording section 130 is composed of a nonvolatile memory such as an electrically erasable programmable read only memory (EEPROM).

<<Operation Section>>

The operation section 140 includes various operation means such as a power switch, a release button, and a mode dial, and outputs a signal corresponding to the operation to the computer 120.

[Operation of Imaging Apparatus]

The imaging apparatus 1 according to the present embodiment is able to capture videos and still images. The operation section 140 sets which is to be imaged.

In addition, for capturing still images, three imaging modes of a normal mode, a continuous imaging mode A, and a continuous imaging mode B are provided, and focus adjustment control according to each mode is performed.

Further, for capturing videos, two imaging modes of a normal mode and a focus scan mode are provided, and focus adjustment control according to each mode is performed.

Hereinafter, contents of the processing will be described for each imaging mode.

<<Still Imaging>>

<Normal Mode>

In the normal mode, so-called contrast focus adjustment control is performed for the annular optical system 14.

In a case where an instruction of autofocus (AF) is given through the operation section 140, the annular optical system focus adjustment controller 120c drives the actuator 50 such that the image sensor 20 is moved from one end to the other end of the movable range. In the movement processing, information about the focus evaluation value of the annular optical system 14 is acquired, and the position of the image sensor 20 at which the acquired evaluation value is maximized is detected. The detected position of the image sensor 20 is set as a focus position of the annular optical system 14, and the image sensor 20 is moved to the focus position. Thereby, the focal point of the annular optical system 14 can be adjusted.

The AF instruction is performed, for example, by pressing the release button halfway. In a case where the release button is pressed halfway and then pressed fully, recording for imaging is instructed. The imaging controller 120b performs imaging processing for recording in response to an instruction for imaging for recording. An image obtained by imaging is recorded in the recording section 130.

As described above, in the normal mode, contrast type focus adjustment control is performed for the annular optical system 14.

<Continuous Imaging Mode A>

In the continuous imaging mode A, still images are captured continuously while the image sensor 20 is moved. The image sensor 20 is moved at a constant pitch from one end to the other end of the movable range. That is, in the continuous imaging mode A, the image sensor 20 is moved within a certain range, and still images are continuously captured.

Figure 11:
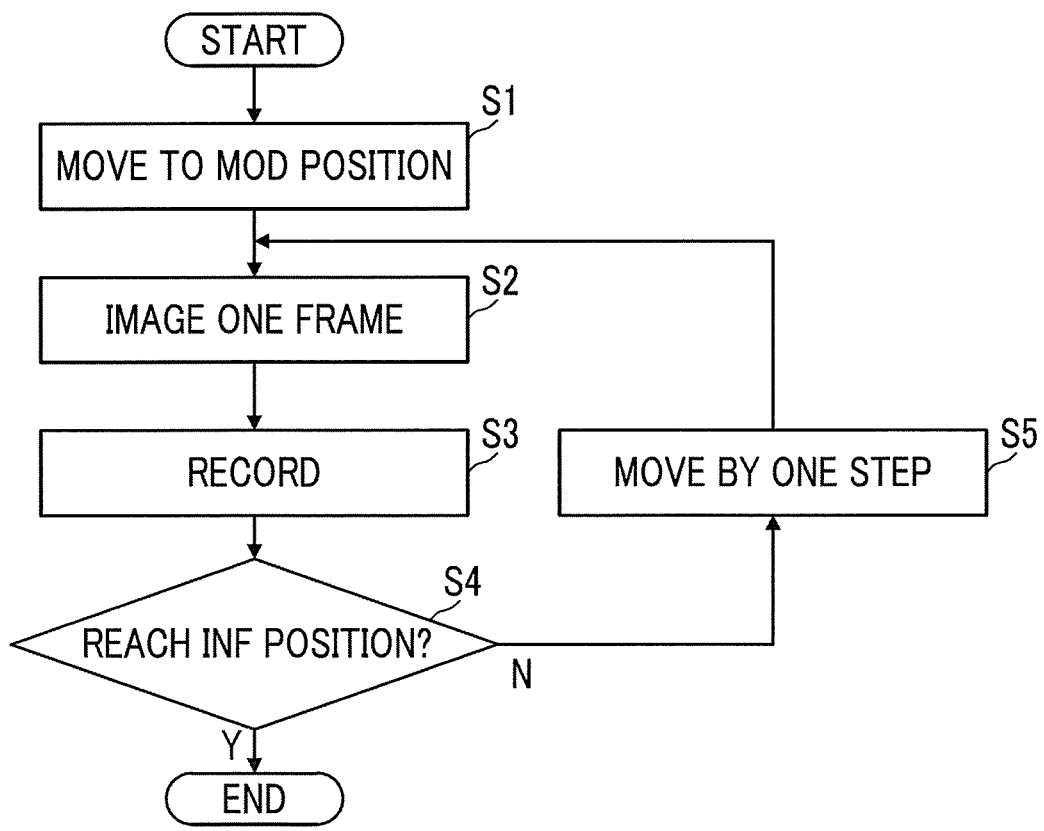
FIG. 11 is a flowchart showing a procedure of imaging processing in a continuous imaging mode A.

FIG. 11 is a flowchart showing the procedure of the imaging processing in the continuous imaging mode A.

In a case where imaging is instructed, the annular optical system focus adjustment controller 120c moves the image sensor 20 to the position (MOD position) of the minimum imaging distance (MOD) (step S1).

Next, imaging for recording is performed (step S2). An image obtained by imaging is recorded in the recording section 130 (step S3).

Next, the annular optical system focus adjustment controller 120c determines whether or not the image sensor 20 reaches a position (INF position) at which the subject at infinity (INF) is brought into focus (step S4).

In a case where it is determined that the INF position is not reached, the annular optical system focus adjustment controller 120c drives the actuator 50 to move the image sensor 20 by one step (step S5). After the movement, imaging processing is performed (step S2).

Thus, in the continuous imaging mode A, the image sensor 20 is moved step by step, and imaging is performed each time. The processing ends in a step where the image sensor 20 reaches the INF position and imaging at the INF position is completed.

The group of still images obtained by imaging is recorded in the recording section 130 in a state where the still images can be distinguished from images obtained by other imaging. For example, the folder is changed for each imaging, and then recording is performed. Alternatively, the same identification tag or the like is attached to a series of images, and the images are recorded.

In a case where there is a main subject between MOD and INF, at least one in-focus image (annular optical system in-focus image) can be captured through the annular optical system 14 by performing imaging in the continuous imaging mode A. Further, in a case where there are a plurality of subjects between MOD and INF, an optional subject can be selected to obtain an in-focus image. In the central optical system 12, an image captured at the same timing as an image, which is set as the in-focus image by the annular optical system 14, is acquired as an in-focus image (central optical system in-focus image) of the central optical system 12.

<Continuous Imaging Mode B>

In continuous imaging mode B, still images are continuously captured while an instruction of imaging is given. At that time, the image sensor 20 is periodically moved. That is, in the continuous imaging mode B, still images are continuously captured while the image sensor is periodically moved.

Figure 12:
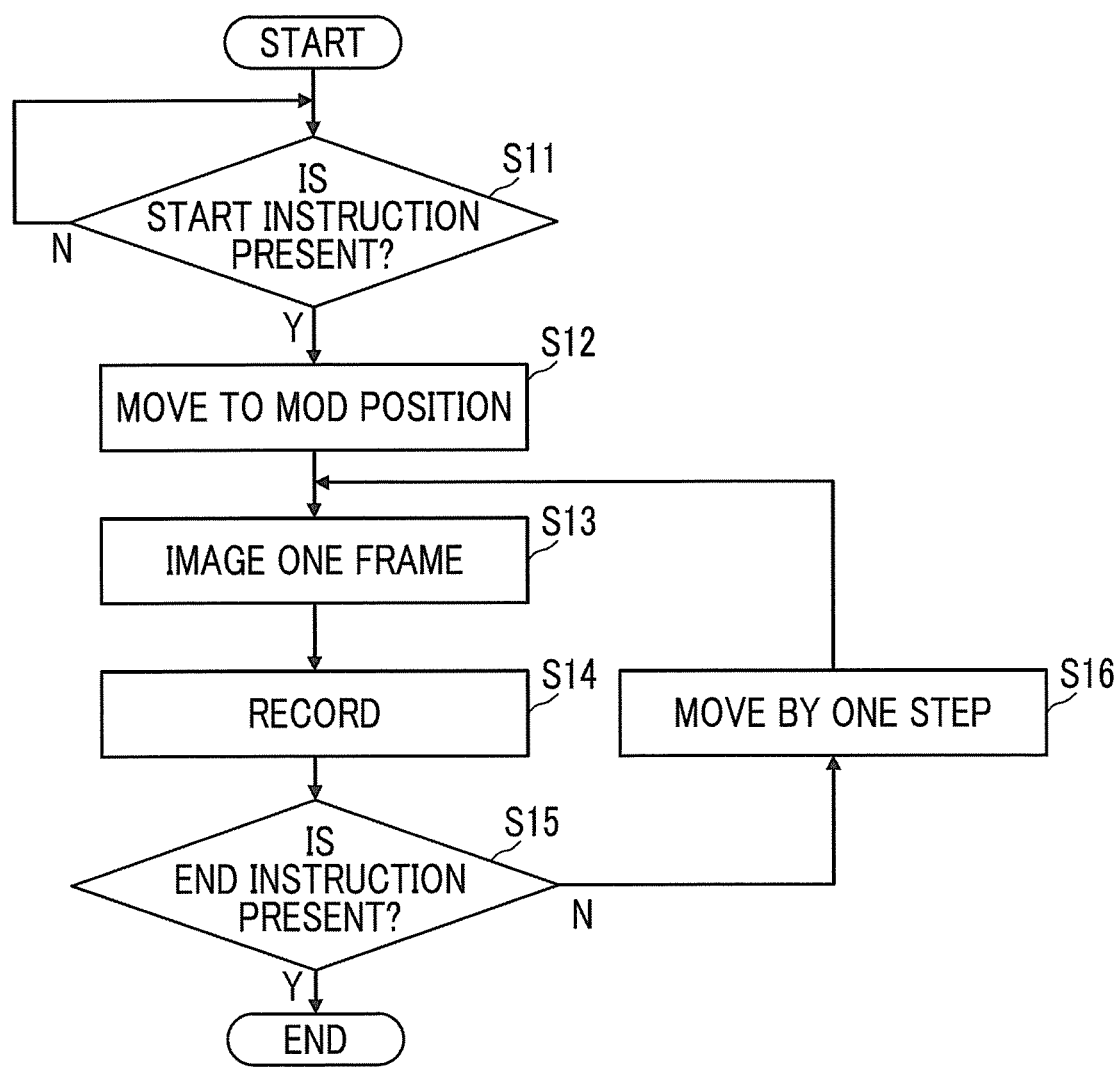
FIG. 12 is a flowchart showing a procedure of imaging processing in a continuous imaging mode B.

FIG. 12 is a flowchart showing the procedure of the imaging processing in the continuous imaging mode B.

First, it is determined whether or not an imaging start instruction is present (step S11). The imaging start instruction is given, for example, by fully pressing the release button.

In a case where it is determined that the imaging start instruction is given, the annular optical system focus adjustment controller 120c moves the image sensor 20 to the MOD position (step S12).

After the movement, imaging for recording is performed (step S13). The image obtained by imaging is recorded in the recording section 130 (step S14).

Thereafter, it is determined whether or not an imaging end instruction is present (step S15). The imaging end instruction is given, for example, by fully pressing the release button. That is, the imaging start instruction is given by the first press of the release button, and the imaging end instruction is given by the second press of the release button. In addition, for example, an imaging instruction may be given while the release button is fully pressed, and an imaging end instruction may be given in a case where released.

In a case where it is determined that the imaging end instruction is not given, the annular optical system focus adjustment controller 120c drives the actuator 50 to move the image sensor 20 by one step (step S16). After the movement, imaging processing is performed (step S13).

As described above, in the continuous imaging mode B, the image sensor 20 is periodically moved to continuously capture still images while periodically changing the distance of the subject which is brought into focus.

Figure 13:
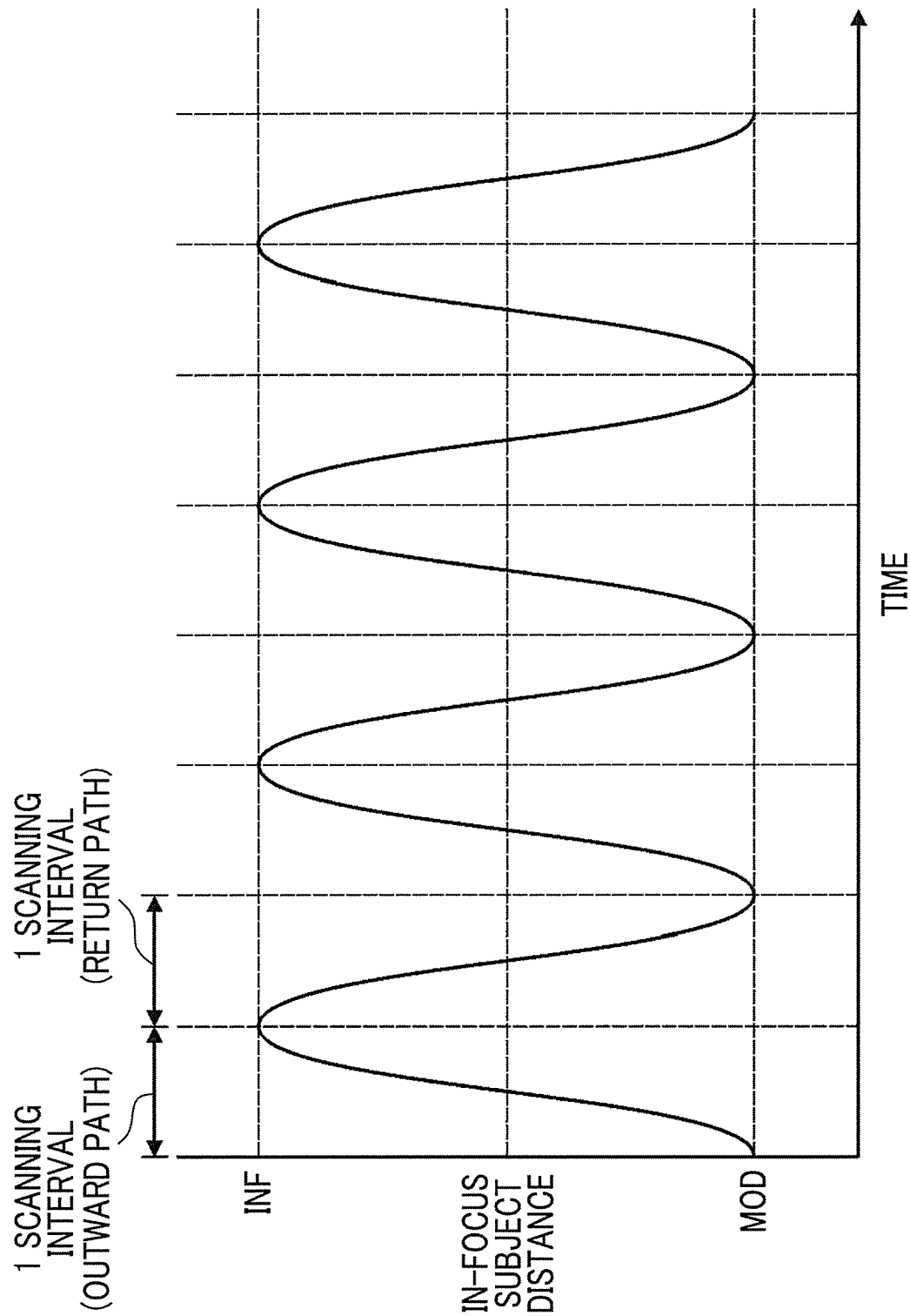
FIG. 13 is a diagram showing an example of a method of changing a distance of a subject which is brought into focus through an annular optical system.

FIG. 13 is a diagram showing an example of a method of changing a distance of the subject which is brought into focus through the annular optical system.

As shown in the drawing, the distance of the subject, which is brought into focus, between MOD and INF (in-focus subject distance) can be changed in a sinusoidal wave manner. In such a case, the image sensor 20 is displaced between the MOD position and the INF position in a sinusoidal wave manner. Thereby, the distance of the subject, which is brought into focus, between MOD and INF can be periodically changed.

A group of still images obtained by imaging is recorded in the recording section 130, with a movement interval from MOD to INF (outward path) and a movement interval from INF to MOD (return path) as one scanning interval. In the annular optical system 14, in a case where a main subject is present between MOD and INF, at least one in-focus image is obtained for each scanning interval.

The in-focus image of the annular optical system 14 (annular optical system in-focus image) can be obtained by analyzing the group of the still images of the annular optical system 14 obtained by imaging for each scanning interval (analyzing for each period of displacement) and by extracting a still image with the highest sharpness (that is, an image with the highest focus evaluation value or an image with the highest contrast).

The in-focus image (central optical system in-focus image) of the central optical system 12 can be obtained by extracting an image captured at the same timing as the in-focus image of the annular optical system 14.

Figure 14:
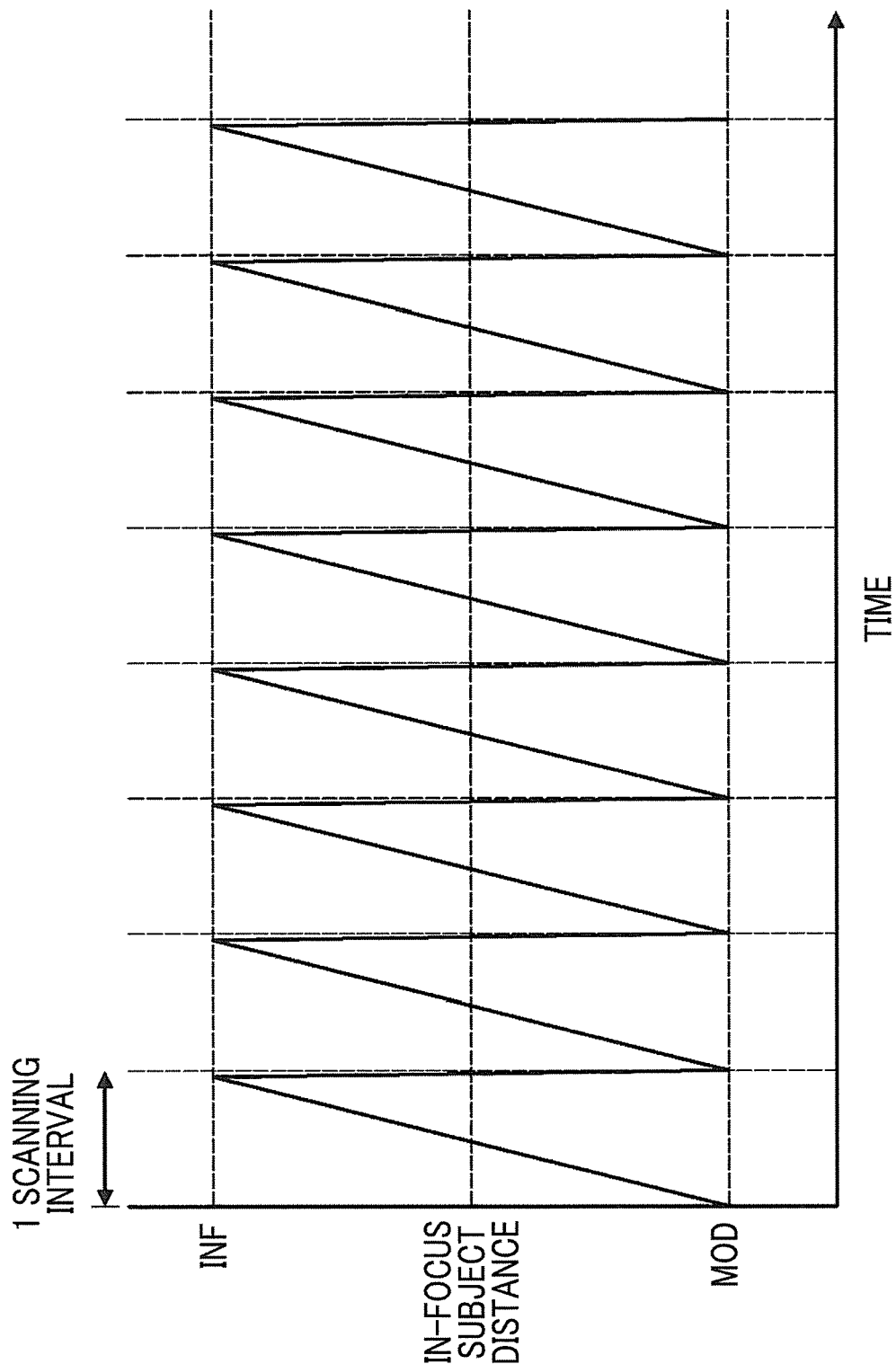
FIG. 14 is a diagram showing another example of a method of changing a distance of a subject which is brought into focus through an annular optical system.

FIG. 14 is a diagram showing another example of a method of changing a distance of the subject which is brought into focus through the annular optical system.

As shown in the drawing, the distance of the subject, which is brought into focus, between MOD and INF (in-focus subject distance) can be changed in a sawtooth wave manner. In such a case, the image sensor 20 is displaced between the MOD position and the INF position in a sawtooth wave manner. Thereby, the distance of the subject, which is brought into focus, between MOD and INF can be periodically changed.

In a case of the displacement in a sawtooth wave manner, the movement interval (outward path) from MOD to INF is recorded in the recording section 130 as one scanning interval. In the annular optical system 14, in a case where a main subject is present between MOD and INF, at least one in-focus image is obtained for each scanning interval.

<<Video Recording>>

<Normal Mode>

In the normal mode, the annular optical system 14 is controlled by continuously performing so-called contrast focus adjustment control such that the main subject is continuously in focus.

<Focus Scan Mode>

In the focus scan mode, the image sensor 20 periodically moves during imaging, and the distance of the subject brought into focus through the annular optical system 14 changes periodically. For example, the distance periodically changes between MOD and INF.

In a case where imaging is started, the annular optical system focus adjustment controller 120c drives the actuator 50 to periodically move the image sensor 20. Thereby, the distance of the subject brought into focus through the annular optical system 14 changes periodically. The image sensor 20 is displaced in a sinusoidal wave manner (refer to FIG. 13) or a sawtooth wave manner (refer to FIG. 14).

As described above, in the focus scan mode, the image sensor 20 is periodically moved to periodically change the distance of the subject which is brought into focus through the annular optical system 14, thereby capturing a video.

The video captured in the focus scan mode is used to acquire a still image focused in the subsequent processing. That is, in the focus scan mode, since the distance of the subject which is brought into focus periodically changes, in a case where the main subject is present within a focusable distance range, the main subject is in focus for at least one frame in each period. Therefore, in the annular optical system 14, in a case where the obtained video is analyzed for each period of displacement of the image sensor 20, at least one in-focus image is obtained for each period. That is, in a case where a frame image with the highest sharpness in each period is extracted, a still image focused in each period can be acquired.

In the central optical system 12, the frame image captured at the same timing as the frame image extracted as the in-focus image by the annular optical system 14 is referred to as an in-focus image (central optical system in-focus image) of the central optical system 12.

[Effect of Imaging Apparatus]

As described above, in the imaging apparatus 1 of the present embodiment, the central optical system 12 is set for pan focus of the fixed focal point, and only the annular optical system 14 has a focus adjustment function. Thereby, a structure can be simplified, and the entire apparatus can be reduced in weight and size.

Further, in a case where the focal point of the annular optical system 14 is adjusted, the central optical system 12 is moved integrally with the image sensor 20. Therefore, the central optical system 12 is able to constantly capture images while maintaining the pan focus state.

Further, since the central optical system 12 is smaller and lighter than the annular optical system 14, even in a case where the central optical system 12 is moved integrally with the image sensor 20, the mechanism can be reduced in weight and size. Further, it is also possible to use the actuator 50 having a small size and a light weight. Thereby, the entire apparatus can be reduced in weight and size.

In addition, even in a case where the central optical system 12 and the image sensor 20 are moved integrally, the structure is lightweight and compact. Therefore, the central optical system 12 and the image sensor 20 can be operated at high speed. Further, it is also possible to prevent vibration, noise, and the like from occurring.

[Modification Example of Imaging Apparatus]

<<Modification Example of Imaging Lens>>

In the above-mentioned embodiment, the imaging lens 10 is configured such that the central optical system 12 is composed of a wide-angle optical system and the annular optical system 14 is composed of a telephoto optical system. However, the configuration of the imaging lens 10 is not limited to this.

However, since the central optical system 12 is set for pan focus, it is preferable to adopt a configuration in which pan focus can be realized relatively easily.

In general, pan focus is more easily realized as the focal length is shorter. Therefore, it is conceivable that the central optical system is composed of a short-focus optical system and the annular optical system is composed of an optical system having a focal length longer than that of the central optical system. Thereby, images with different focal lengths can be simultaneously captured on the same axis. Therefore, for example, the central optical system can be composed of a wide-angle optical system, and the annular optical system 14 can be composed of a standard optical system.

In general, a standard optical system refers to an optical system having an angle of view of around 50°. The wide-angle optical system refers to an optical system that has a wider angle of view (approximately 60° or more) than the standard optical system and that is able to image a wide range. The telephoto optical system is an optical system that has an optical system with a longer focal length than the standard optical system and is able to image a long-distance subject in an enlarged manner.

In general, as imaging is performed at a longer distance, pan focus is easier to be achieved. Accordingly, the central optical system can be set to perform imaging at a long range and the annular optical system can be set to perform imaging at a short range. Thereby, two images at the long range and the short range can be captured simultaneously on the same axis.

In general, as the distance to the subject increases, the depth of field increases. Therefore, a long-distance subject can be imaged with pan focus. On the other hand, it is difficult to image a short-distance subject with pan focus. Therefore, a long-distance subject is imaged through a pan-focus central optical system, and a short-distance subject is imaged through an annular optical system having a focus adjustment function. Thereby, images focused at both a long range and a short range can be captured simultaneously.

Here, the terms "long range" and "short range" are relationships determined between the central optical system and the annular optical system. That is, the central optical system is set to image a short-distance subject with respect to the annular optical system, and the annular optical system is set to image a long-distance subject with respect to the central optical system.

However, a distance, at which imaging can be performed with pan focus because of imaging with pan focus, is set for the central optical system. For example, in a case of ranging from a wide angle to a standard angle of view (approximately 50° or more), the central optical system is set to perform imaging in a range of 3 m to infinity.

In addition, in a case of performing imaging at a long range and a short range, it is also possible to adopt a configuration in which the telephoto optical system performs imaging at a long range and the wide-angle optical system performs imaging at a short range.

Further, the lens configuration of each optical system in the imaging apparatus shown in FIG. 1 is an example, and other lens configurations may be adopted. In particular, in the above-mentioned embodiment, the annular optical system is composed of a catadioptric system. However, the annular optical system may be configured without using reflection. In addition, since the annular optical system is composed of a catadioptric system, the whole structure can be made compact.

Further, in the above-mentioned embodiment, the annular optical system 14 is composed of one optical system, but may be composed of a plurality of optical systems. For example, the annular optical system may be divided into two and may be composed of optical systems having different focal lengths. In such a case, the image sensor is configured to selectively receive light from each optical system of the annular optical system. In a case where the annular optical system is composed of a plurality of optical systems, the annular optical system may be divided in the circumferential direction or may be divided into a plurality of concentric shapes.

<<Modification Example of Annular Optical System Focus Adjustment Mechanism>>

In the above-mentioned embodiment, the central optical system 12 and the image sensor 20 are connected by a linear shaft that linearly moves, and the linear shaft is linearly moved by a linear motor. However, the configuration, in which the central optical system 12 and the image sensor 20 are integrally moved, is not limited to this. In addition, for example, the central optical system 12 and the image sensor 20 may be configured to be integrally moved by a driving mechanism in which a feed screw and a motor are combined. Further, the central optical system 12 and the image sensor 20 can be moved integrally by a driving mechanism in which a cam cylinder and a motor are combined.

Further, the central optical system 12 and the image sensor 20 can be moved manually. Also in a case of manual movement, the central optical system 12 and the image sensor 20 are lightweight, and thus can be moved with a light force.

<<Annular Optical System in-Focus Image Extraction Section and Central Optical System in-Focus Image Extraction Section>>

The imaging apparatus may have a function of extracting the annular optical system in-focus image and the central optical system in-focus image from the group of the still images captured in the continuous imaging mode A and the continuous imaging mode B. Similarly, the imaging apparatus may have a function of extracting an annular optical system in-focus image and a central optical system in-focus image from a video captured in the focus scan mode.

<Function of Extracting Annular Optical System in-Focus Image and Central Optical System in-Focus Image from Group of Still Images Captured in Continuous Imaging Mode A>

The processing of extracting the annular optical system in-focus image from the group of the still images captured in the continuous imaging mode A is performed as follows. That is, the group of the still images of the annular optical system obtained by imaging is analyzed, and an image with the highest sharpness is extracted as the annular optical system in-focus image.

In the central optical system in-focus image, the still image of the central optical system captured at the same timing as the still image extracted as the annular optical system in-focus image is set as the central optical system in-focus image.

This processing is performed by the computer 120, for example. That is, by executing a predetermined program, the computer 120 functions as an annular optical system in-focus image extraction section and a central optical system in-focus image extraction section. The annular optical system in-focus image extraction section and the central optical system in-focus image extraction section read out the image data recorded in the recording section 130 and execute an extraction processing.

In a case where the extraction processing is performed, only the extracted image may be recorded in the recording section 130.

<Function of Extracting Annular Optical System in-Focus Image and Central Optical System in-Focus Image from Group of Still Images Captured in Continuous Imaging Mode B>

The processing of extracting the annular optical system in-focus image from the group of the still images captured in the continuous imaging mode B is performed as follows. That is, the group of the still images of the annular optical system obtained by imaging is analyzed for each displacement period of the central optical system and the image sensor, and the image with the highest sharpness is extracted for each displacement period as the annular optical system in-focus image.

In the central optical system in-focus image, the still image of the central optical system captured at the same timing as the still image extracted as the annular optical system in-focus image is set as the central optical system in-focus image.

This processing is performed by the computer 120, for example. That is, by executing a predetermined program, the computer 120 functions as an annular optical system in-focus image extraction section and a central optical system in-focus image extraction section. The annular optical system in-focus image extraction section and the central optical system in-focus image extraction section read out the image data recorded in the recording section 130 and execute an extraction processing. Alternatively, the extraction processing is performed in real time for each period.

In a case where the extraction processing is performed, only the extracted image may be recorded in the recording section 130.

<Function of Extracting Annular Optical System in-Focus Image and Central Optical System in-Focus Image from Video Captured in Focus Scan Mode>

The processing of extracting the annular optical system in-focus image from the video captured in the focus scan mode is performed as follows. That is, the video of the annular optical system obtained by imaging is analyzed for each displacement period of the central optical system and the image sensor, and the frame image with the highest sharpness is extracted for each displacement period as the annular optical system in-focus image.

In the central optical system in-focus image, the central optical system frame image captured at the same timing as the frame image extracted as the annular optical system in-focus image is set as the central optical system in-focus image.

This processing is performed by the computer 120, for example. That is, by executing a predetermined program, the computer 120 functions as an annular optical system in-focus image extraction section and a central optical system in-focus image extraction section. The annular optical system in-focus image extraction section and the central optical system in-focus image extraction section read out the image data recorded in the recording section 130 and execute an extraction processing. Alternatively, the extraction processing is performed in real time for each period.

In a case where the extraction processing is performed, only the extracted image may be recorded in the recording section 130.

Mobile Imaging Apparatus

[Configuration of Mobile Imaging Apparatus]

The mobile imaging apparatus is an apparatus configured such that the imaging apparatus according to the present invention is mounted on a moving body and two images can be simultaneously captured on the same axis while the imaging apparatus is moved.

Figure 15:
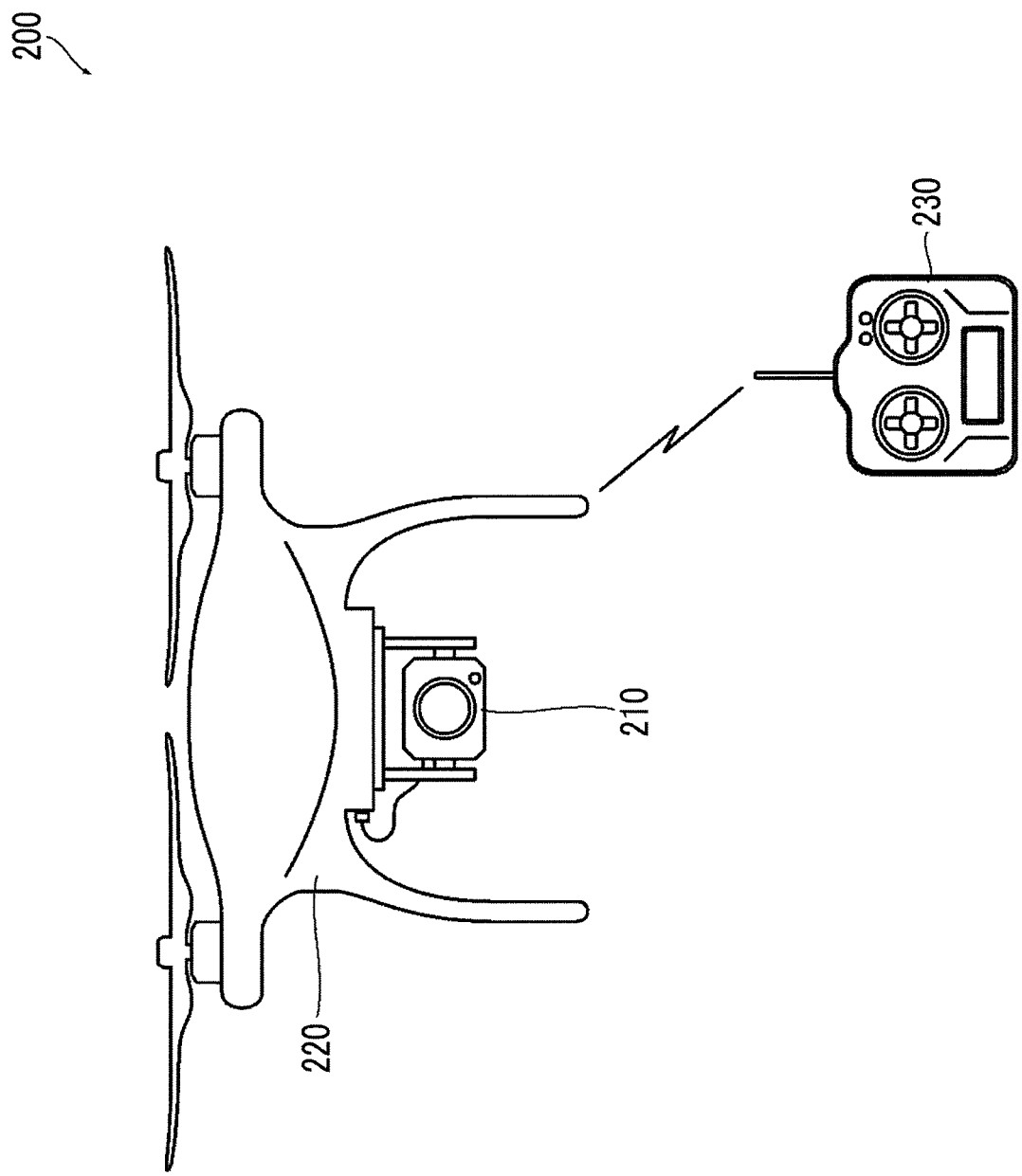
FIG. 15 is a diagram showing a schematic configuration of an embodiment of a mobile imaging apparatus.

FIG. 15 is a diagram showing a schematic configuration of an embodiment of the mobile imaging apparatus.

The mobile imaging apparatus 200 of the present embodiment is configured to comprise an imaging apparatus 210, an unmanned aircraft 220 on which the imaging apparatus 210 is mounted, and a controller 230 that remotely controls the imaging apparatus 210 and the unmanned aircraft 220.

<<Imaging Apparatus>>

The configuration of the imaging apparatus 210 is basically the same as the configuration of the imaging apparatus 1 described in the above-mentioned embodiment. That is, a wide-angle central optical system, a telephoto annular optical system, and an image sensor having directivity are provided, and the central optical system and the image sensor are moved integrally to adjust the focal point of the annular optical system.

It should be noted that the imaging apparatus 210 according to the present embodiment is remotely operated by the controller 230 and thus comprises wireless communication means for performing wireless communication with the controller 230.

<<Unmanned Aircraft>>

The unmanned aircraft 220 is an example of a moving body. The unmanned aircraft 220 is a so-called drone and flies in the atmosphere on the basis of an operation performed by the controller 230. Since the configuration of this type of unmanned aircraft is known, a detailed description thereof will be omitted.

[Imaging Performed by Mobile Imaging Apparatus]

In the mobile imaging apparatus 200, the unmanned aircraft 220 flies in the atmosphere on the basis of the operation of the controller 230. Further, on the basis of the operation of the controller 230, the imaging apparatus 210 captures a still image or a video.

The mobile imaging apparatus 200 is the same as the imaging apparatus 1 described in the above-mentioned embodiment in that a normal mode, a continuous imaging mode A, and a continuous imaging mode B are provided as imaging modes for a still image and a normal mode and a focus scan mode are provided as moving imaging modes.

The mobile imaging apparatus 200 of the present embodiment is appropriate for the following applications since the mobile imaging apparatus 200 is able to simultaneously capture telephoto and wide-angle images on the same axis. In other words, this configuration is appropriate for applications in which the ground surface is continuously imaged from the midair and the obtained image groups are joined so as to generate a single composite image in which a wide area is captured. Such a kind of composite image is generally generated by extracting corresponding feature points between adjacent images and aligning and combining the images such that the corresponding feature points overlap each other. The mobile imaging apparatus 200 of the present embodiment can simultaneously capture a telephoto and wide-angle image on the same axis. Thus, it can be said that the processing of extracting feature points is performed on the wide-angle image and the synthesis processing is performed on the telephoto image. By performing the processing of extracting feature points on a wide-angle image, more feature points can be extracted, and alignment can be performed with higher accuracy. Further, in the image synthesis, a higher-definition composite image can be generated by using a telephoto image.

In addition, as a technique of generating the composite image, the following technique can be adopted. A series of groups of the still images obtained by imaging are analyzed to estimate the relative position and the posture of the imaging apparatus in a case where each image is captured. Then, on the basis of the estimation result, the images are arranged, thereby generating a composite image. At this time, the wide-angle image group obtained by imaging is analyzed to estimate the relative position and the posture of the imaging apparatus in a case where each image is captured. Then, on the basis of the estimation result, the telephoto images are arranged, thereby generating a composite image. Thereby, a high-definition composite image can be generated with high accuracy. For example, a structure-from-motion (SfM) technique can be adopted as a technique of estimating the relative position and the posture of the imaging apparatus in a case where each image is captured.

For the purpose of generating a composite image, still images are captured in the continuous imaging mode B. That is, the still images are continuously captured while the distance of the subject which is brought into focus is periodically changed. Alternatively, a video is captured in the focus scan mode. That is, the video is captured while the distance of the subject which is brought into focus is periodically changed.

In a case where the purpose is to generate a composite image, it is preferable to control the flight of the unmanned aircraft 220 as follows.

Figure 16:
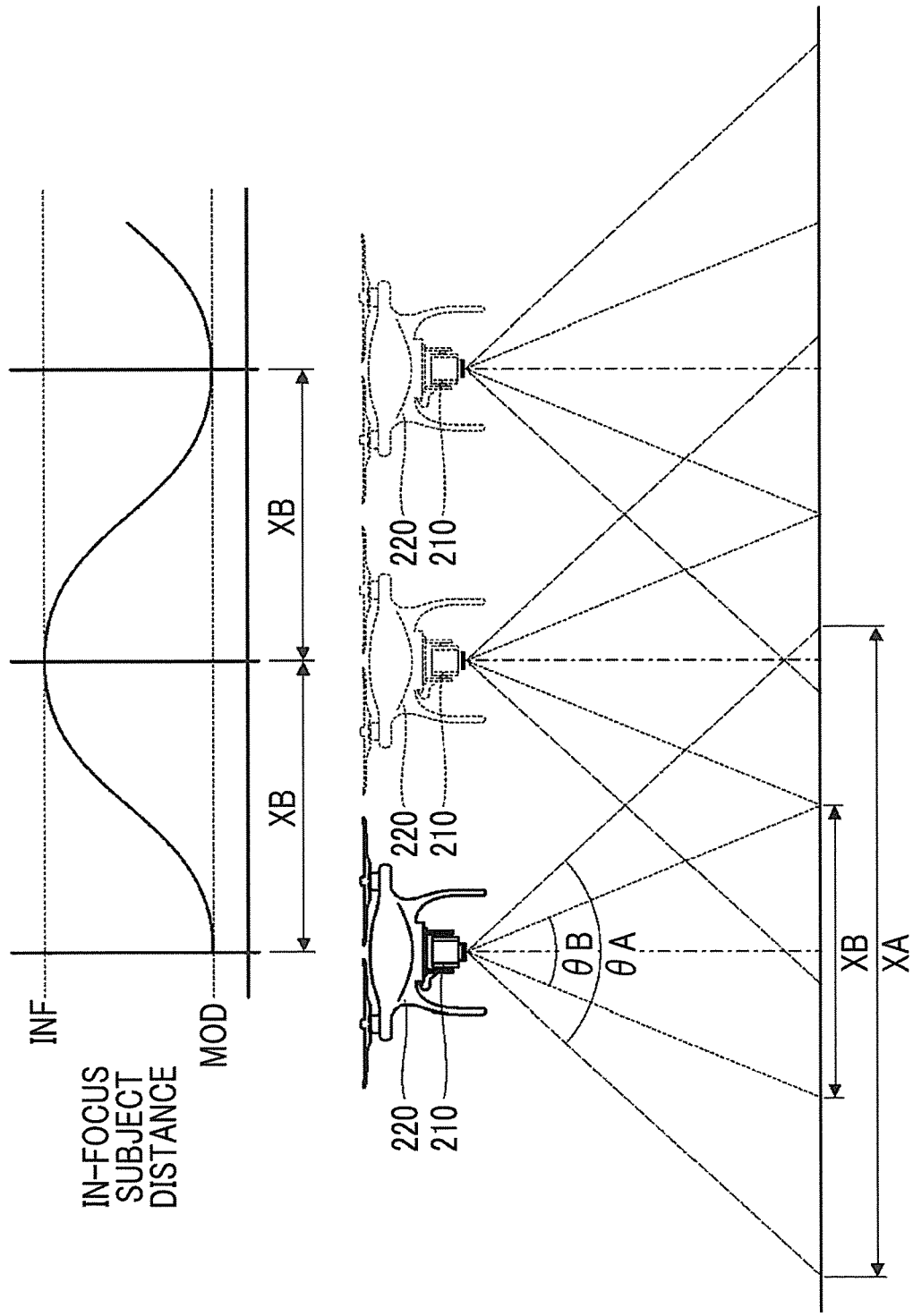
FIG. 16 is a conceptual diagram of unmanned aircraft flight control for the purpose of generating a composite image.

FIG. 16 is a conceptual diagram of flight control of an unmanned aircraft for the purpose of generating a composite image.

Hereinafter, a case where an image is captured by directing the imaging apparatus 210 immediately below from a certain altitude is considered. In such a case, the range of the angle of view θA is imaged by the central optical system, and the range of the angle of view θB is imaged by the telephoto optical system.

In the moving direction of the unmanned aircraft 220, the width of the imaging range of the central optical system is XA, and the width of the imaging range of the annular optical system is XB.

In such a case, the unmanned aircraft 220 is set to a speed at which scanning is performed at least once while the distance XB is moved.

It should be noted that the scanning described herein means changing the distance of the subject, which is brought into focus, from MOD to INF or from INF to MOD.

By controlling the flight of the unmanned aircraft 220 in such a manner, it is possible to capture annular optical system in-focus images to be synthesized without any interval.

Other Embodiments

In the above-mentioned embodiment, functions implemented by the computer can be implemented by various processors. Various kinds of processors include a programmable logic device (PLD) that is a processor capable of changing a circuit configuration after manufacturing of a central processing unit (CPU), a field programmable gate array (FPGA), or the like as a general-purpose processor functioning as a processing section that performs various kinds of processing by executing programs, a dedicated electric circuit that is a processor having a circuit configuration designed exclusively for executing specific processing of an application specific integrated circuit (ASIC) or the like, and the like.

One function may be implemented by two or more processors having the same type or different types. For example, a configuration implemented by a plurality of FPGAs or a configuration implemented by a combination of a CPU and an FPGA may be used.

A plurality of functions may be implemented by a single processor. As an example of a configuration in which a plurality of functions are implemented by a single processor, first, as typified by a computer such as a client or a server, a single processor is configured by a combination of one or more CPUs and software. With such a configuration, there is a form in which the processor implements a plurality of functions. Second, as typified by a system on chip (SoC), there is a form in which a processor having a plurality of functions implemented by one integrated circuit chip (IC) is used. In such a manner, various functions are implemented by using one or more of the various processors as a hardware structure.

Further, more specifically, hardware structures of such various processors each are an electric circuit in which circuit elements such as semiconductor elements are combined.

EXAMPLE

Example 1

FIG. 17 is a table showing the relationship between the position of the image sensor and the in-focus subject distance of the annular optical system in the imaging apparatus shown in FIG. 1.

The focal length of the annular optical system is 44 mm. In addition, the drawing shows a relationship within a certain range of around a reference in-focus subject distance in a case where the reference in-focus subject distance is set to 1000 [mm].

The distance from a second principal point (also referred to as an image-side principal point or a rear-side principal point) of the annular optical system 14 to the surface of the image sensor 20 is referred to as an "image sensor position". The distance from a first principal point (also referred to as the front principal point) of the annular optical system 14 to the subject is referred to as the "in-focus subject distance".

Figure 18:
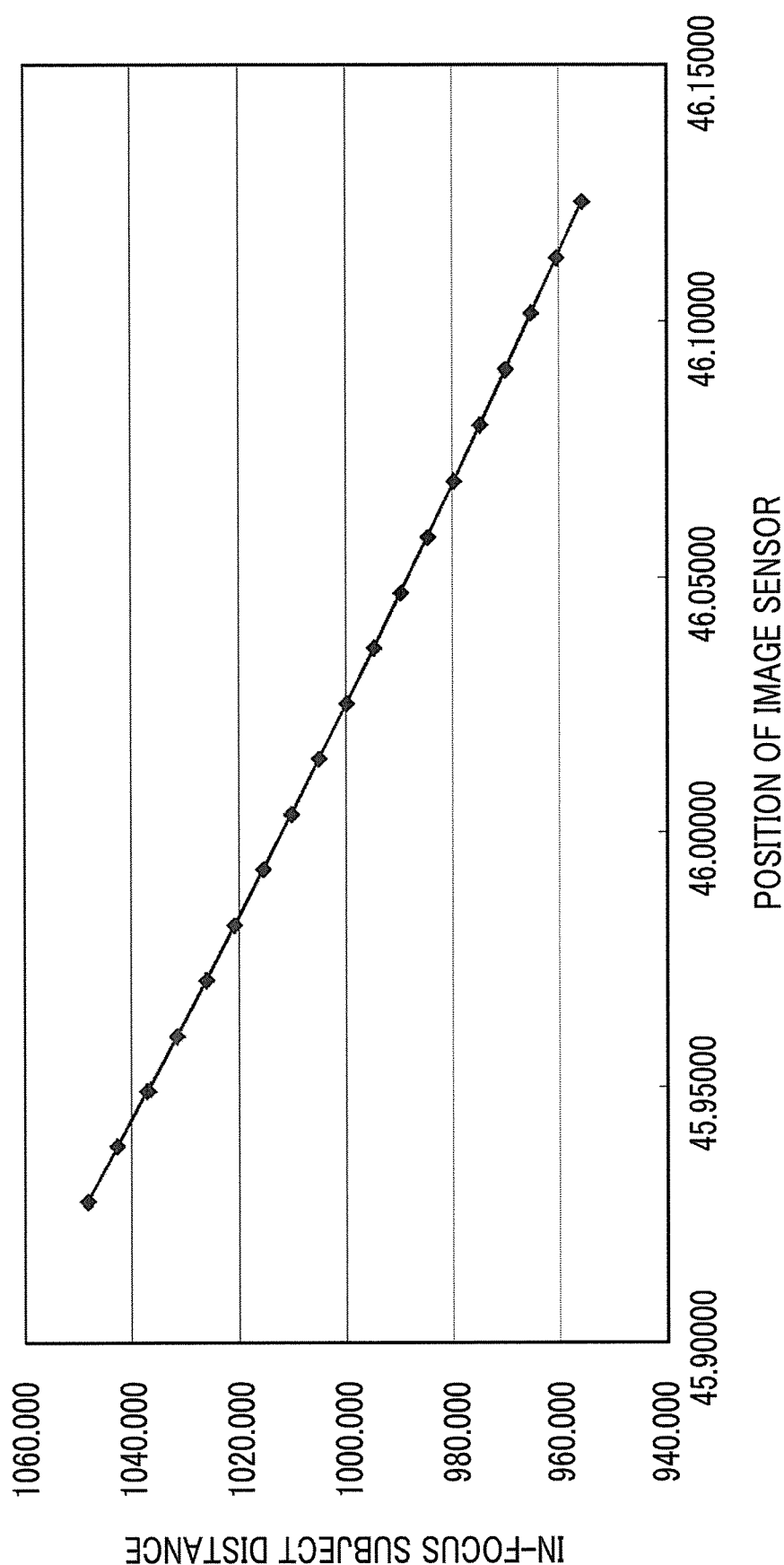
FIG. 18 is a graph showing the relationship between the position of the image sensor and the in-focus subject distance of the annular optical system.

FIG. 18 is a graph showing the relationship between the position of the image sensor and the in-focus subject distance of the annular optical system.

As shown in the drawing, in a case where the image sensor 20 is displaced with respect to the fixed annular optical system 14, the in-focus subject distance of the annular optical system 14 changes.

Figure 20:
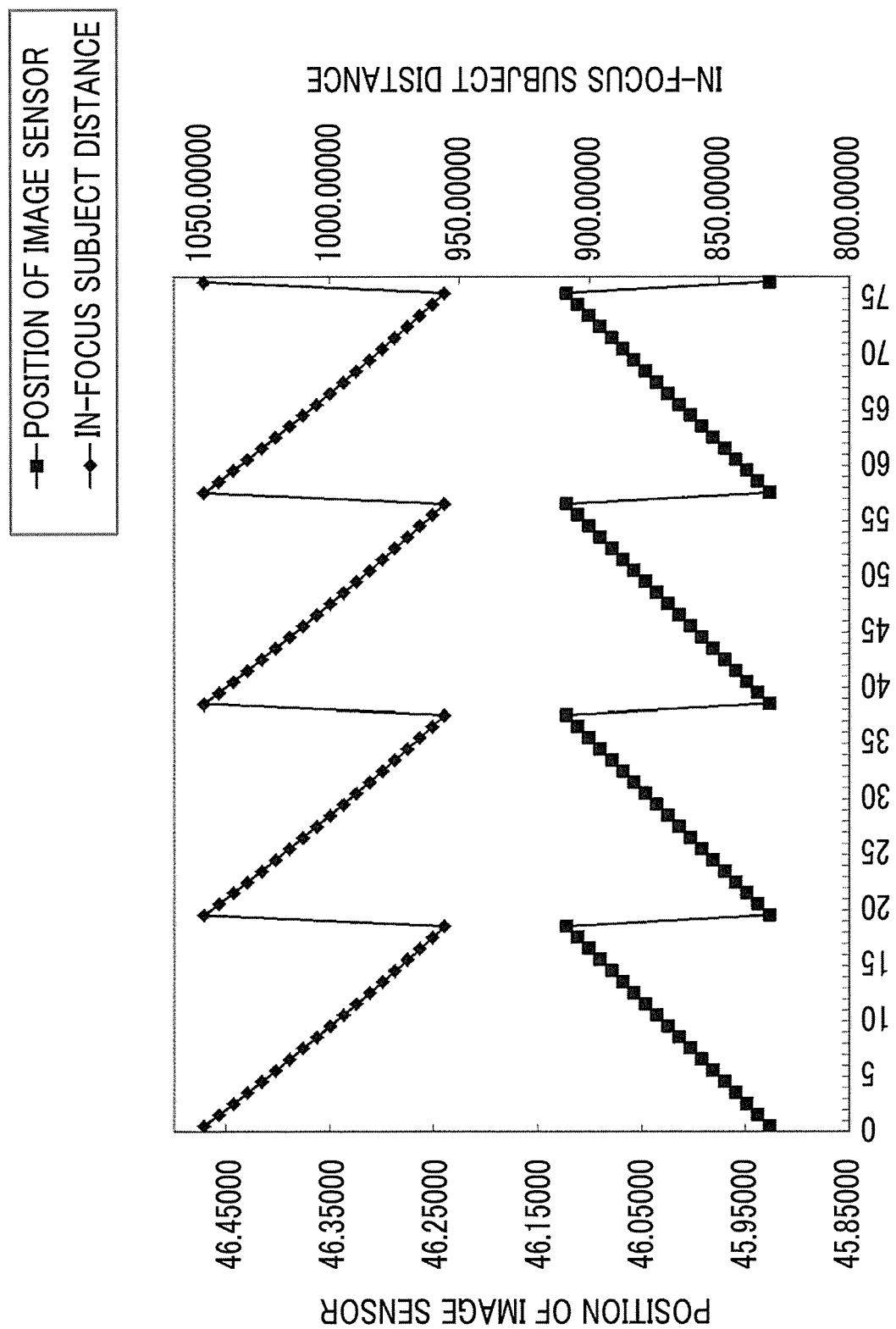
FIG. 20 is a graph showing the relationship between the position of the image sensor and the in-focus subject distance of the annular optical system in a case where the image sensor is displaced in a sawtooth wave manner.

FIGS. 19A and 19B are tables showing the relationship between the position of the image sensor and the in-focus subject distance of the annular optical system in a case where the image sensor is displaced in a sawtooth wave manner. FIG. 20 is a graph showing the relationship between the position of the image sensor and the in-focus subject distance of the annular optical system in a case where the image sensor is displaced in a sawtooth wave manner.

As shown in the drawing, in a case where the image sensor 20 is displaced in a sawtooth wave manner with respect to the fixed annular optical system 14, the in-focus subject distance of the annular optical system 14 also changes in a sawtooth wave manner.

Figure 22:
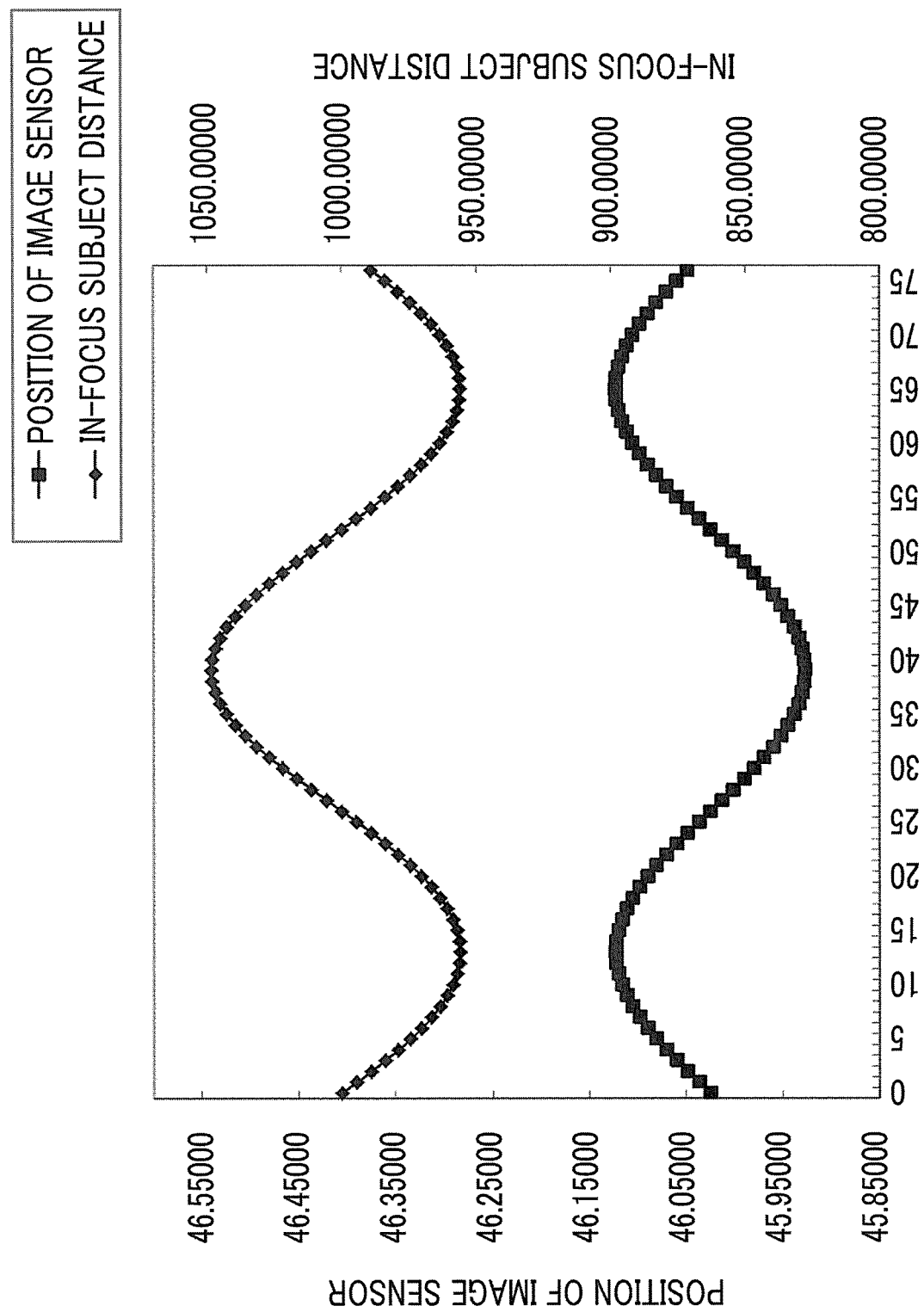
FIG. 22 is a graph showing the relationship between the position of the image sensor and the in-focus subject distance of the annular optical system in a case where the image sensor is displaced in a sinusoidal wave manner.

FIGS. 21A and 21B are tables showing the relationship between the position of the image sensor and the in-focus subject distance of the annular optical system in a case where the image sensor is displaced in a sinusoidal wave manner. FIG. 22 is a graph showing the relationship between the position of the image sensor and the in-focus subject distance of the annular optical system in a case where the image sensor is displaced in a sinusoidal wave manner.

As shown in the drawing, in a case where the image sensor 20 is displaced in a sinusoidal wave manner with respect to the fixed annular optical system 14, the in-focus subject distance of the annular optical system 14 also changes in a sinusoidal wave manner.

Example 2

FIG. 23 is a table showing the relationship between the position of the image sensor and the in-focus subject distance of the annular optical system in the imaging apparatus shown in FIG. 1.

The focal length of the annular optical system is 84 mm. In addition, the drawing shows a relationship within a certain range of around a reference in-focus subject distance in a case where the reference in-focus subject distance is set to 5000 [mm].

Figure 24:
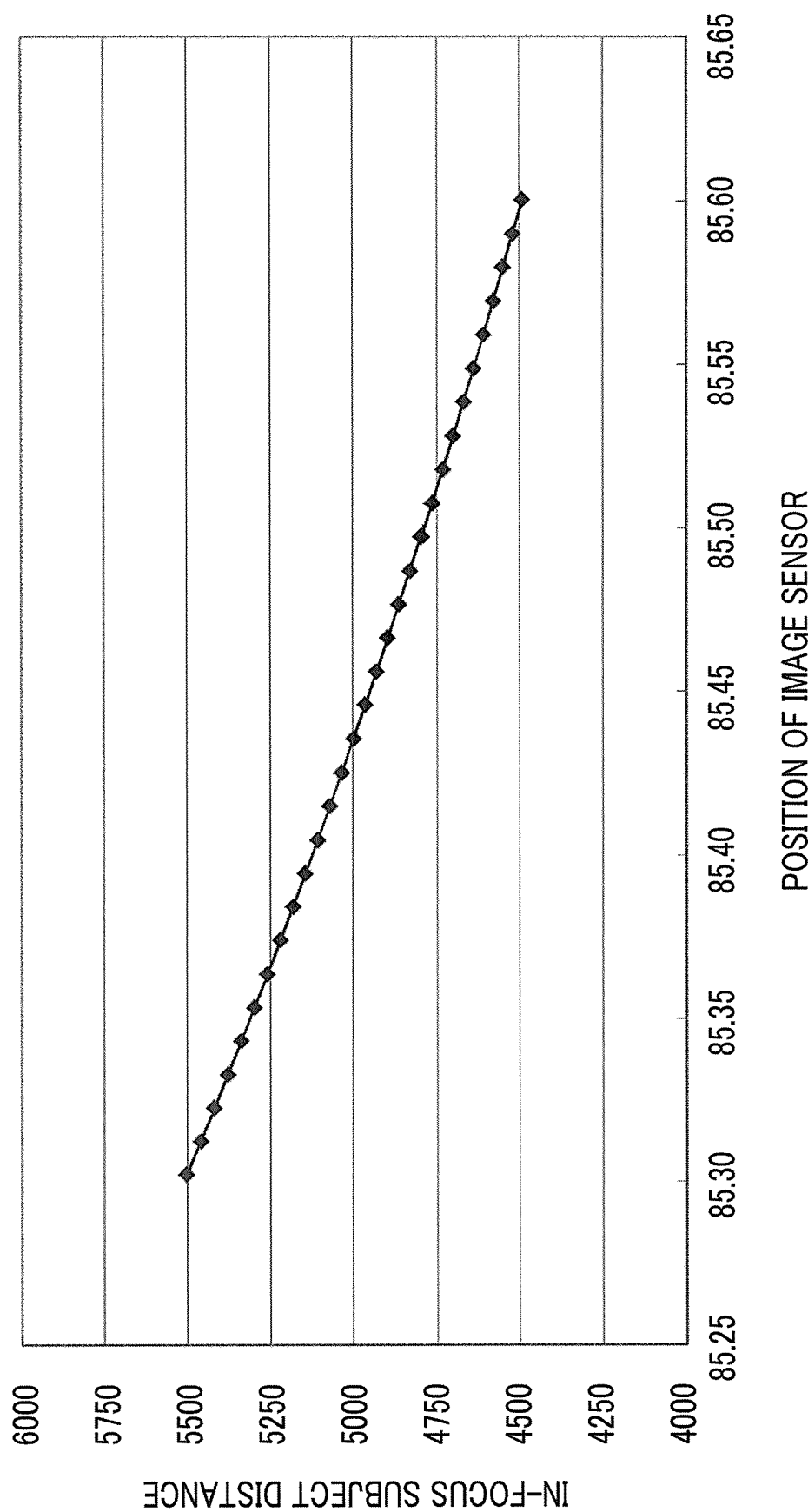
FIG. 24 is a graph showing the relationship between the position of the image sensor and the in-focus subject distance of the annular optical system.

FIG. 24 is a graph showing the relationship between the position of the image sensor and the in-focus subject distance of the annular optical system.

As shown in the drawing, in a case where the image sensor 20 is displaced with respect to the fixed annular optical system 14, the in-focus subject distance of the annular optical system 14 changes.

Figure 26:
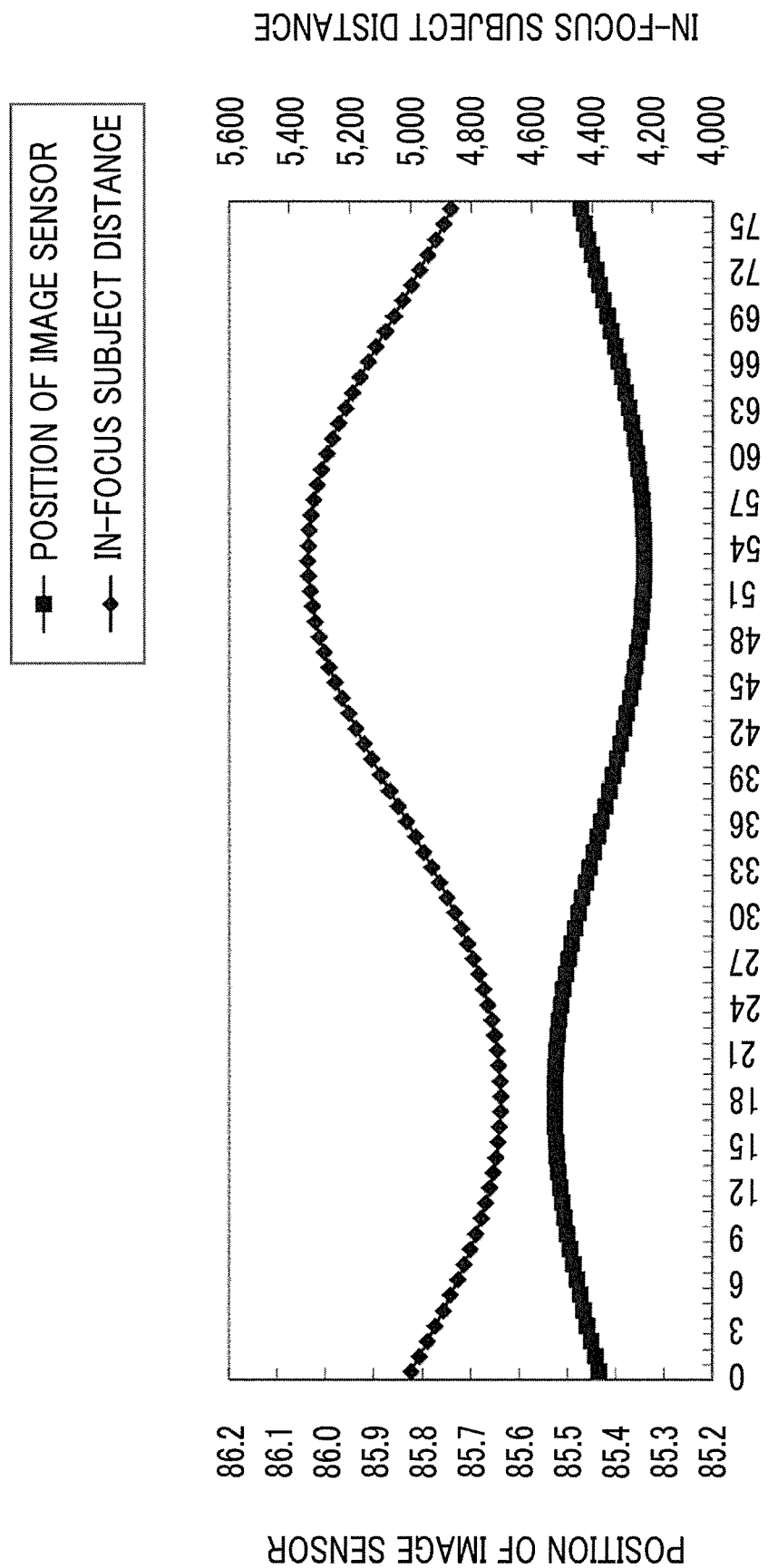
FIG. 26 is a graph showing the relationship between the position of the image sensor and the in-focus subject distance of the annular optical system in a case where the image sensor is displaced in a sinusoidal wave manner.

FIGS. 25A and 25B are tables showing the relationship between the position of the image sensor and the in-focus subject distance of the annular optical system in a case where the image sensor is displaced in a sinusoidal wave manner. FIG. 26 is a graph showing the relationship between the position of the image sensor and the in-focus subject distance of the annular optical system in a case where the image sensor is displaced in a sinusoidal wave manner.

As shown in the drawing, in a case where the image sensor 20 is displaced in a sinusoidal wave manner with respect to the fixed annular optical system 14, the in-focus subject distance of the annular optical system 14 also changes in a sinusoidal wave manner.

EXPLANATION OF REFERENCES

1: imaging apparatus
10: imaging lens
12: central optical system
12a: lens
12b: lens
12c: lens
12d: lens
12e: lens
12f: lens
12g: lens
12h: lens
14: annular optical system
14a: first lens
14b: second lens
14c: third lens
14d: primary mirror
14e: secondary mirror
20: image sensor
20a: image sensor driver
22a: central optical system light receiving pixel
22b: annular optical system light receiving pixel
24: photodiode
26: microlens
28: light blocking mask
30: annular optical system focus adjustment mechanism
32: fixed cylinder
34: moving cylinder
36: image sensor holder
38A: linear bush
38B: linear bush
40A: linear shaft
40B: linear shaft
42A: moving cylinder support arm
42B: moving cylinder support arm
44A: front slit
44B: front slit
46A: holder support arm
46B: holder support arm
48A: rear slit
48B: rear slit
50: actuator
50A: coil
50B: magnet
50a: linear motor driver
60: position detection unit
62: photo interrupter
64: MR sensor
110: analog signal processing section
120: computer
120a: digital signal processing section
120b: imaging controller
120c: annular optical system focus adjustment controller
120d: position detection section
120e: image output controller
120f: recording controller
130: recording section
140: operation section
150a: central optical system image output terminal
150b: annular optical system image output terminal
200: mobile imaging apparatus
210: imaging apparatus
220: unmanned aircraft
230: controller
ImT: image captured by annular optical system (telephoto image)
ImW: image captured by central optical system (wide-angle image)
L: optical axis
La: light passing through central optical system
Lb: light passing through annular optical system
S1 to S5: procedure of image processing in continuous imaging mode A
S11 to S16: procedure of image processing in continuous imaging mode B
XA: width of imaging range of central optical system in movement direction of unmanned aircraft
XB: width of imaging range of annular optical system in movement direction of unmanned aircraft
θA: angle of view of central optical system
θB: angle of view of annular optical system

What is claimed is:

1. An imaging apparatus comprising:
    a central optical system that is set to capture an image with pan focus;
    an annular optical system that is disposed concentrically with the central optical system;
    an image sensor that has pixels which selectively receive light passing through the central optical system, and pixels which selectively receive light passing through the annular optical system, wherein the pixels which selectively receive light passing through the central optical system and the pixels which selectively receive light passing through the annular optical system are being regularly arranged to be coplanar, and that simultaneously captures an image to be formed through the central optical system and an image to be formed through the annular optical system; and
    an annular optical system focus adjustment mechanism that adjusts a focal point of the annular optical system by integrally moving the central optical system and the image sensor along an optical axis with respect to the annular optical system.

2. The imaging apparatus according to claim 1,
    wherein the annular optical system has a focal length longer than a focal length of the central optical system.

3. The imaging apparatus according to claim 2,
    wherein the central optical system is composed of a wide-angle optical system, and
    wherein the annular optical system is composed of a telephoto optical system.

4. The imaging apparatus according to claim 3,
wherein the annular optical system is composed of a catadioptric system.

5. The imaging apparatus according to claim 1,
wherein the central optical system is set to capture an image at a long range, and
wherein the annular optical system is set to capture an image at a short range.

6. The imaging apparatus according to claim 1, further comprising:
an imaging controller that causes the image sensor to capture a video or continuously capture still images; and
an annular optical system focus adjustment controller that controls the annular optical system focus adjustment mechanism,
wherein the annular optical system focus adjustment controller periodically displaces the central optical system and the image sensor during imaging, and periodically changes a distance of a subject which is brought into focus through the annular optical system.

7. The imaging apparatus according to claim 2, further comprising:
an imaging controller that causes the image sensor to capture a video or continuously capture still images; and
an annular optical system focus adjustment controller that controls the annular optical system focus adjustment mechanism,
wherein the annular optical system focus adjustment controller periodically displaces the central optical system and the image sensor during imaging, and periodically changes a distance of a subject which is brought into focus through the annular optical system.

8. The imaging apparatus according to claim 3, further comprising:
an imaging controller that causes the image sensor to capture a video or continuously capture still images; and
an annular optical system focus adjustment controller that controls the annular optical system focus adjustment mechanism,
wherein the annular optical system focus adjustment controller periodically displaces the central optical system and the image sensor during imaging, and periodically changes a distance of a subject which is brought into focus through the annular optical system.

9. The imaging apparatus according to claim 4, further comprising:
an imaging controller that causes the image sensor to capture a video or continuously capture still images; and
an annular optical system focus adjustment controller that controls the annular optical system focus adjustment mechanism,
wherein the annular optical system focus adjustment controller periodically displaces the central optical system and the image sensor during imaging, and periodically changes a distance of a subject which is brought into focus through the annular optical system.

10. The imaging apparatus according to claim 5, further comprising:
an imaging controller that causes the image sensor to capture a video or continuously capture still images; and
an annular optical system focus adjustment controller that controls the annular optical system focus adjustment mechanism,
wherein the annular optical system focus adjustment controller periodically displaces the central optical system and the image sensor during imaging, and periodically changes a distance of a subject which is brought into focus through the annular optical system.

11. The imaging apparatus according to claim 6,
wherein the annular optical system focus adjustment controller displaces the central optical system and the image sensor in a sinusoidal wave manner.

12. The imaging apparatus according to claim 7,
wherein the annular optical system focus adjustment controller displaces the central optical system and the image sensor in a sinusoidal wave manner.

13. The imaging apparatus according to claim 8,
wherein the annular optical system focus adjustment controller displaces the central optical system and the image sensor in a sinusoidal wave manner.

14. The imaging apparatus according to claim 9,
wherein the annular optical system focus adjustment controller displaces the central optical system and the image sensor in a sinusoidal wave manner.

15. The imaging apparatus according to claim 10,
wherein the annular optical system focus adjustment controller displaces the central optical system and the image sensor in a sinusoidal wave manner.

16. The imaging apparatus according to claim 6,
wherein the annular optical system focus adjustment controller displaces the central optical system and the image sensor in a sawtooth wave manner.

17. The imaging apparatus according to claim 7,
wherein the annular optical system focus adjustment controller displaces the central optical system and the image sensor in a sawtooth wave manner.

18. The imaging apparatus according to claim 6, further comprising
an annular optical system in-focus image extraction section that analyzes a video or a group of the still images captured through the annular optical system for each period of displacement of the central optical system and the image sensor, and that extracts a frame image with a highest sharpness or a still image with a highest sharpness as an annular optical system in-focus image for each period of displacement.

19. The imaging apparatus according to claim 18, further comprising
a central optical system in-focus image extraction section that extracts a frame image or a still image captured at the same timing as the annular optical system in-focus image, as a central optical system in-focus image, from the video or the group of the still images captured through the central optical system.

20. A mobile imaging apparatus comprising:
the imaging apparatus according to claim 1; and
a moving body on which the imaging apparatus is mounted.

* * * * *